(12) United States Patent
Zhang et al.

(10) Patent No.: US 9,379,857 B2
(45) Date of Patent: *Jun. 28, 2016

(54) COMMUNICATION METHOD AND COMMUNICATION APPARATUS

(71) Applicant: Sun Patent Trust, New York, NY (US)

(72) Inventors: Zhi Zhang, Beijing (CN); Ming Xu, Beijing (CN); Masayuki Hoshino, Kanagawa (JP); Seigo Nakao, Singapore (SG); Daichi Imamura, Beijing (CN)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/799,443

(22) Filed: Jul. 14, 2015

(65) Prior Publication Data
US 2015/0341147 A1  Nov. 26, 2015

Related U.S. Application Data

(63) Continuation of application No. 14/455,236, filed on Aug. 8, 2014, now Pat. No. 9,112,643, which is a continuation of application No. 13/696,052, filed as application No. PCT/CN2011/072389 on Apr. 1, 2011, now Pat. No. 8,837,270.

(30) Foreign Application Priority Data

May 6, 2010 (CN) .......................... 2010 1 0175872

(51) Int. Cl.
*H04J 11/00* (2006.01)
*H04L 5/00* (2006.01)
(Continued)

(52) U.S. Cl.
CPC ............. *H04L 5/0007* (2013.01); *H04J 13/004* (2013.01); *H04J 13/12* (2013.01);
(Continued)

(58) Field of Classification Search
CPC ... H04L 5/0007; H04L 5/0026; H04L 5/0048; H04L 5/0066; H04J 13/004; H04J 13/12; H04J 13/18
USPC ......... 370/203, 204, 205, 206, 207, 208, 335, 370/342, 428–429, 441
See application file for complete search history.

(56) References Cited

U.S. PATENT DOCUMENTS 7,260,054 B2   8/2007  Olszewski
7,746,766 B2   6/2010  Kowalski et al.
(Continued)

FOREIGN PATENT DOCUMENTS

CN    101247208 A   8/2008
CN    101459458 A   6/2009
(Continued)

OTHER PUBLICATIONS

Catt, "Further investigation on DMRS design for LTE-A," R1-100021, Agenda Item: 7.2.1, 3GPP TSG RAN WG1 Meeting #59bis, Valencia, Spain, Jan. 18-22, 2010, 6 pages.
(Continued)

*Primary Examiner* — Kevin Mew
(74) *Attorney, Agent, or Firm* — Seed IP Law Group PLLC

(57) ABSTRACT

The present disclosure provides an orthogonal codes based code division multiplexing method of performing the code division multiplexing of demodulation reference signals in multiple layers of resource blocks by using orthogonal matrices, the method comprising: changing the order of chips in particular rows of a first orthogonal matrix to obtain a second orthogonal matrix with the changed order of chips; and multiplying the chips in respective rows of the second orthogonal matrix by the demodulation reference signals in corresponding layers of resource blocks correspondingly in the time direction to obtain code division multiplexing signals. The technical scheme of the present disclosure can improve the power jitter situation of downlink signals on the time, thereby the usage efficiency of the power amplifier at the base station side can be improved.

11 Claims, 16 Drawing Sheets

(51) Int. Cl.
*H04L 12/26* (2006.01)
*H04J 13/00* (2011.01)
*H04J 13/12* (2011.01)
*H04J 13/18* (2011.01)

(52) U.S. Cl.
CPC .............. *H04J 13/18* (2013.01); *H04L 5/0026* (2013.01); *H04L 5/0048* (2013.01); *H04L 5/0066* (2013.01); *H04L 43/087* (2013.01)

(56) References Cited

U.S. PATENT DOCUMENTS

| | | | |
|---|---|---|---|
| 7,764,744 | B2 | 7/2010 | Choi et al. |
| 7,978,778 | B2 | 7/2011 | Wallace et al. |
| 8,014,265 | B2 | 9/2011 | Sarkar et al. |
| 8,462,643 | B2 | 6/2013 | Walton et al. |
| 8,520,498 | B2 | 8/2013 | Walton et al. |
| 8,536,658 | B2 | 9/2013 | Wu et al. |
| 8,537,658 | B2 | 9/2013 | Sayana et al. |
| 9,042,484 | B2 * | 5/2015 | Kang ................... H04L 5/0048 375/299 |
| 2001/0001616 | A1 * | 5/2001 | Rakib ................. H03M 13/256 375/259 |
| 2003/0223354 | A1 | 12/2003 | Olszewski |
| 2005/0088959 | A1 | 4/2005 | Kadous |
| 2006/0182017 | A1 | 8/2006 | Hansen et al. |
| 2007/0291638 | A1 | 12/2007 | Chae et al. |
| 2009/0210794 | A1 * | 8/2009 | Pendse ................ G06F 9/44584 715/726 |
| 2010/0041350 | A1 * | 2/2010 | Zhang .................... H04B 7/068 455/101 |
| 2010/0067512 | A1 * | 3/2010 | Nam ...................... H04B 7/068 370/342 |
| 2010/0172434 | A1 * | 7/2010 | Chun .................... H04L 5/0007 375/295 |
| 2010/0246711 | A1 | 9/2010 | Kishigami et al. |
| 2011/0013505 | A1 * | 1/2011 | Dyson ................... H04J 13/12 370/208 |
| 2011/0097079 | A1 | 4/2011 | Hanawa |
| 2011/0142003 | A1 * | 6/2011 | Kuchi .................. H04B 7/0413 370/330 |
| 2011/0142020 | A1 | 6/2011 | Kang et al. |
| 2012/0002740 | A1 | 1/2012 | Han et al. |
| 2012/0002753 | A1 * | 1/2012 | Annavajjala .......... H04L 5/0023 375/298 |
| 2012/0039270 | A1 | 2/2012 | Nguyen et al. |
| 2012/0113795 | A1 * | 5/2012 | Ko ........................ H04J 13/004 370/209 |
| 2012/0188988 | A1 * | 7/2012 | Chung .................... H04J 13/00 370/335 |
| 2013/0070580 | A1 | 3/2013 | Wang et al. |

FOREIGN PATENT DOCUMENTS

| | | |
|---|---|---|
| CN | 101686110 A | 3/2010 |
| JP | 2009-147939 A | 7/2009 |
| WO | 2007/083502 A1 | 7/2007 |
| WO | 2008/083502 A1 | 7/2008 |
| WO | 2010/002041 A1 | 1/2010 |

OTHER PUBLICATIONS

English Translation of Chinese Search Report dated Oct. 14, 2014, for corresponding Chinese Application No. 201180022406.4, 2 pages.

Ericsson, ST-Ericsson, "Layer-to-antenna port mapping for LTE-Advanced," R1-100848, Agenda Item: 7.2.1, 3GPP TSG-RAN WG1 #60, San Francisco, USA, Feb. 22-26, 2010, 6 pages.

Extended European Search Report, dated Oct. 7, 2014, for corresponding European Application No. 11777120.4-1852 / 2567481, 8 pages.

Huawei, "Remaining issues for DMRS," R1-101951, 3GPP TSG RAN WG1 meeting #60bis, Agenda Item: 6.3.1, Beijing, China, Apr. 12-16, 2010, 10 pages.

International Search Report dated Jul. 7, 2011 for corresponding International Application No. PCT/CN2011/072389, 2 pages.

LG Electronics, "DM RS sequence design for dual layer beamforming," R1-094467, Agenda Item: 6.4.1, 3GPP TSG RAN WG1 #59, Jeju, Republic of Korea, Nov. 9-13, 2009, 4 pages.

NTT Docomo, "Downlink DM-RS Structure for Rank 5-8 in LTE-Advanced," R1-100496, Agenda Item: 7.2.1, 3GPP TSG RAN WG1 Meeting #59bis, Valencia, Spain, Jan. 18-22, 2010, 10 pages.

* cited by examiner

FIG.1(A) Walsh code matrix:

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix}$$ Code word 1, Code word 2, Code word 3, Code word 4

- W: S1*(1)+S2*(1)+S3*(1)+S4*(1)
- X: S1*(1)+S2*(-1)+S3*(1)+S4*(-1)
- Y: S1*(1)+S2*(1)+S3*(-1)+S4*(-1)
- Z: S1*(1)+S2*(-1)+S3*(-1)+S4*(1)

Code word 1, Code word 2, Code word 3, Code word 4

- Code word 1: W*(1)+X*(1)+Y*(1)+Z*(1) ⇒ S1
- Code word 2: W*(1)+X*(-1)+Y*(1)+Z*(-1) ⇒ S2
- Code word 3: W*(1)+X*(1)+Y*(-1)+Z*(-1) ⇒ S3
- Code word 4: W*(1)+X*(-1)+Y*(-1)+Z*(1) ⇒ S4

```
                    ┌─────────────────────────────┐  S2110
                    │ Receive code division        │
                    │ multiplexing signals in      │
                    │ multiple layers of resource  │
                    │ blocks                       │
                    └──────────────┬──────────────┘
                                   │
                                   ▼
                    ┌─────────────────────────────┐  S2120
                    │ Multiply the chips in        │
                    │ respective rows of the       │
                    │ orthogonal matrix by the     │
                    │ code division multiplexing   │
                    │ signals in corresponding     │
                    │ layers of resource blocks    │
                    │ correspondingly in the time  │
                    │ direction to obtain          │
                    │ demodulation reference       │
                    │ signals                      │
                    └─────────────────────────────┘
```

FIG. 21

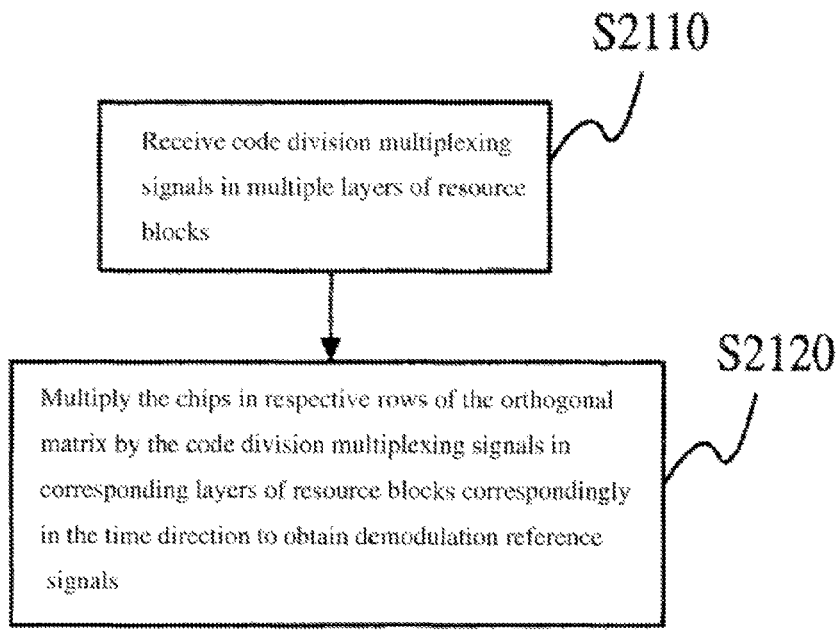

COMMUNICATION METHOD AND COMMUNICATION APPARATUS

TECHNICAL FIELD

The present disclosure relates to signal multiplexing techniques and de-multiplexing techniques of the communication field.

BACKGROUND ART

Orthogonal codes based Code Division Multiplexing (CDM) techniques are widely applied in the technical field of wireless communication. The most classic CDM technique is to expand different signals by using different orthogonal sequences, and superpose them so as to eliminate interferences between the superposed signals by means of the orthogonal property among different sequences. Because of this advantage, the CDM techniques are widely applied for multiplexing different signals in the wireless communication system.

FIG. 1(A) to FIG. 1(D) are diagrams showing the principle of the CDM multiplexing using four-dimensional Walsh codes. As shown in FIG. 1(A), the code words used in CDM are orthogonal to each other, which means correlations between the different code words are zero. As shown in FIG. 1(B), in the CDM multiplexing, different signals S1, S2, S3, S4 correspond to different code words respectively, and the different signals are respectively multiplied by chips in the corresponding code words. The result of the multiplication produces expansions of signals. The expansions produced by the different signals are superposed to form the multiplexed signals W, X, Y, Z. As shown in FIG. 1(C), the multiplexed signals W, X, Y, Z are transmitted on a communication channel. The expansions of signals by CDM may be performed either on the time domain or on the frequency domain. As shown in FIG. 1(D), in the CDM de-multiplexing, the signals after the CDM expansion are correlated with the corresponding code words to recover the original signals S1, S2, S3, S4.

In the CDM multiplexing using orthogonal codes, the orthogonality among the different orthogonal code words is the most essential characteristic of the conventional orthogonal CDM. In the wireless communication, the most widely used orthogonal code is Walsh code, and the length of such code can be 2, 4, 8, 16 . . . (a power of 2). The different orthogonal code words may form an orthogonal matrix.

FIG. 2 is a schematic diagram showing that different base stations transmit multiple data streams to a mobile terminal in a wireless communication system.

As shown in FIG. 2, adjacent base stations 201 and 202 may include multiple antennas respectively, and transmit multiple data streams to a mobile terminal 203 in a way of spatial multiplexing respectively. The data streams may be divided into multiple layers, for example, each data stream may include two or more layers of data stream. Here, it is shown that each data stream includes a first layer of data stream and a second layer of data stream respectively.

FIG. 3 is a diagram showing an example of a resource block constituting a data stream transmitted to a mobile terminal from a base station in a wireless communication system.

In FIG. 3, one resource block (RB) constituting a data stream is shown. The horizontal axis of the resource block represents time, while the vertical axis represents frequency bandwidth. The horizontal axis is divided into 14 segments, each of which forms one OFDM symbol along the vertical axis beginning at the horizontal axis. The vertical axis is divided into 12 segments, each of which is one sub-carrier along the horizontal axis beginning at the vertical axis. Each of small squares in the resource block represents one resource unit. All of 12×14 resource units in the resource block constitute one sub-frame on the horizontal axis. The first three columns of the resource units in the resource block constitute a control region for transmitting control data. Other resource units without grid lines are used to transfer data signals. In the same base station including multiple antennas, for example, in the base station 201, the multiple data streams may be transmitted to the mobile terminal 203 in a way of spatial multiplexing. The multiple data streams are located at different layers respectively, and each layer of data streams of the resource block may use the same time and frequency resources. For example, the multiple antennas of the base station 201 may transmit two layers of data streams, that is, a first layer of data streams and a second layer of data streams, to the mobile terminal 203 through spatial modulation, and the corresponding resource blocks in each layer of data streams may be located at the same time and frequency resources, that is, at the same time and frequency but using different pre-coding manners.

Resource units 301 represented by grid lines are used to transmit demodulation reference signals (DMRS) of a dedicated channel specific to a cell, the demodulation reference signals are used to demodulate data signals transferred in the resource block in a mobile terminal. Here, each resource block includes multiple demodulation reference signals which are distributed at predetermined time and frequency positions. In order to correctly demodulate the data in the multiple layers superposed on the time and the frequency, the LTE-Advanced provides the demodulation reference signals (DMRS) which are orthogonal with each other for the superposed data layers.

FIG. 4 shows an example that the different layers of demodulation reference signals are multiplexed by using an orthogonal matrix.

FIG. 4 is an instance in the LTE-A Release-9 standard. In FIG. 4, Walsh codes with the code length of 2 such as [1, 1] and [1, −1] are used to multiplex two layers of demodulation reference signals orthogonal with each other. Specifically, the Walsh code [1, 1] is multiplied by respective demodulation reference signals in the first layer of the resource block, and the second code [1, −1] of the Walsh matrix is multiplied by respective demodulation reference signals in the second layer of the resource block.

FIG. 5 shows a sectional diagram of a resource block after Walsh codes with the code length of 2 such as [1, 1] and [1, −1] are used to multiplex two layers of demodulation reference signals.

The result after multiplexing two layers of orthogonal demodulation reference signals on one resource block is as shown in FIG. 5. For the sake of clarity, FIG. 5 shows only a part of the resource block. In FIG. 5, it is assumed that the pre-coding factor for demodulation reference signals in the first layer of the resource block is A, and the pre-coding factor for demodulation reference signals in the second layer of the resource block is B. In the adjacent two OFDM symbols placed with the demodulation reference signals, one always has a value of A+B, the other always has a value of A-B. When A=B, one symbol always has a peak value of (A+B), and the other symbol has always a value of zero. However, in order to ensure the usage efficiency of a Power Amplifier (PA) in a base station, power fluctuation on the time (that is, between the different OFDM symbols) of emission power is required to be as little as possible. If the above mapping manner from the orthogonal multiplexing codes of the demodulation reference signals to the resource block is employed, when A=B (as shown in FIG. 5), peak values and zero values alternately appear in the OFDM symbols containing the demodulation reference signals, which will cause the power fluctuation between the different OFDM symbols increasing. In order to address the problem, a mapping manner as shown in FIG. 6 is actually employed in the LTE-Advanced Release-9.

FIG. 6 shows an actual mapping manner of the code division multiplexing based on the orthogonal codes in the LTE-A Release-9.

In FIG. 6, RB1 and RB2 are two resource blocks adjacent on the frequency domain. The characteristic of such a mapping manner is that, for the demodulation reference signals multiplexed with the code word [1, −1], mappings thereof on the resource blocks are alternately reverse on different sub-carriers. The result of such a mapping manner is shown in FIG. 7.

FIG. 7 shows a sectional diagram of resource blocks after the Walsh codes with the code length of 2 such as [1, 1] and [1, −1] are used to multiplex the two layers of demodulation reference signals in the LTE-A Release-9.

It can be easily seen, by comparing FIG. 5 with FIG. 7, that the peak value (A+B) and zero value appear alternately on the different OFDM symbols when A=B, which reduces the impact of power fluctuation on the power amplifier.

However, when the number of layers of demodulation reference signals for code division multiplexing is multiple, the case that the peak values and the zero values cannot be distributed evenly as shown in FIG. 4 still exists.

SUMMARY OF THE DISCLOSURE

The present disclosure is made in consideration of the above aspects.

According to one aspect of the present disclosure, there is provided a code division multiplexing method based on orthogonal codes of performing the code division multiplexing of demodulation reference signals in multiple layers of resource blocks by using the orthogonal matrices, the method comprising: changing the order of chips in particular rows of a first orthogonal matrix to obtain a second orthogonal matrix with the changed order of chips; and multiplying the chips in respective rows of the second orthogonal matrix by the demodulation reference signals in corresponding layers of resource blocks in the time direction to obtain code division multiplexing signals.

According to another aspect of the present disclosure, there is provided a de-multiplexing method of de-multiplexing code division multiplexing signals in multiple layers of resource blocks by using orthogonal matrices, the method comprising: receiving the code division multiplexing signals in the multiple layers of resource blocks; multiplying the chips in respective rows of the orthogonal matrix by the code division multiplexing signals in corresponding layers of resource blocks in the time direction to obtain demodulation reference signals, the orthogonal matrix being obtained by changing the order of chips in particular rows of another orthogonal matrix.

According to a further aspect of the present disclosure, there is provided a code division multiplexing device based on orthogonal codes for performing the code division multiplexing of demodulation reference signals in multiple layers of resource blocks by using orthogonal matrices, the device comprising: a processing unit which changes the order of chips in particular rows of a first orthogonal matrix to obtain a second orthogonal matrix with the changed order of chips; and a multiplexing unit which multiplies the chips in respective rows of the second orthogonal matrix correspondingly by the demodulation reference signals in corresponding layers of resource blocks in the time direction to obtain code division multiplexing signals.

According to a still further aspect of the present disclosure, there is provided a de-multiplexing device for de-multiplexing code division multiplexing signals in multiple layers of resource blocks by using orthogonal matrices, the device comprising: a receiving unit which receives the code division multiplexing signals in the multiple layers of resource blocks; a de-multiplexing unit which multiplies the chips in respective rows of the orthogonal matrix correspondingly by the code division multiplexing signals in corresponding layers of resource blocks in the time direction to obtain the demodulation reference signals, the orthogonal matrix being obtained by changing the order of the chips in particular rows of another orthogonal matrix.

According to methods and devices of the present disclosure, distributions of the peak values and the zero values can be evened on the time domain, the forward compatibility of the LTE-A Release-9 can be kept, that is, the first layer and second layer of demodulation reference signals use the mapping manner of Release-9, and dual-orthogonality on the time domain and the frequency domain is possessed. Thereby, the power fluctuation situation of downlink signals on the time can be improved, the usage efficiency of the power amplifier at the base station side can be improved, and the demodulation reference signals are robust on the time and frequency selectively fading channels.

BRIEF DESCRIPTION OF THE DRAWINGS

These and/or other aspects and advantages of the present disclosure will become more distinct and easier to be understood in a detailed description of embodiments of the present disclosure below in combination with attached drawings, in which:

FIG. 1(A) to FIG. 1(D) are diagrams showing that the characteristics of the CDM multiplexing and de-multiplexing based on the orthogonal codes are illustrated based on an example of the four-dimensional Walsh codes;

FIG. 21 is a flowchart of a de-multiplexing method according to the present embodiment;

FIG. 22 shows an example of a four-dimensional discrete Fourier transform matrix;

DESCRIPTION OF THE EMBODIMENTS

Figures 1B, 1C, 1D:
Figure 2:
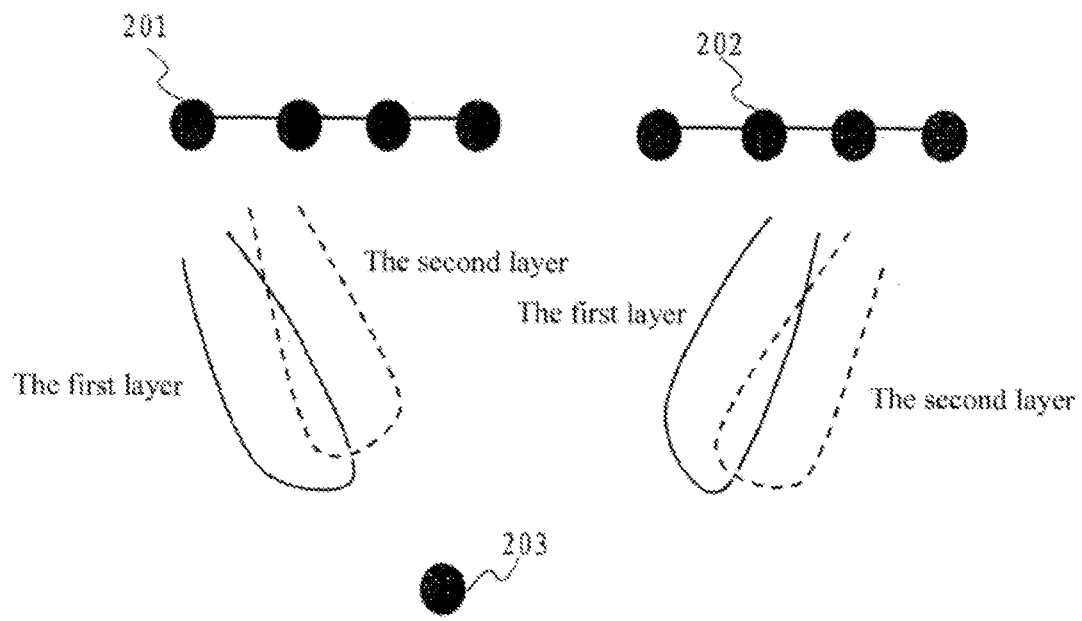
FIG. 2 is a schematic diagram showing that different base stations transmit multiple data streams to a mobile terminal in a wireless communication system.

In the following, some specific embodiments of the present disclosure will be described in detail with reference to attached drawings. If the detailed description of the related prior art may confuse the main points of the disclosure, the detailed description thereof will not be provided herewith. In respective embodiments, the identical reference numerals are used to denote elements or units performing the same functions.

Figure 8:
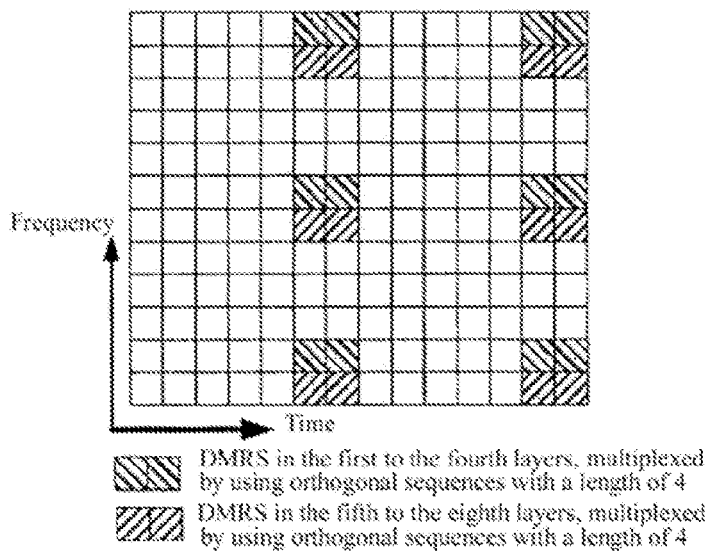
FIG. 8 shows a case of the demodulation reference signals of a resource block in the LTE-A Release-10.

FIG. 8 shows a case of the demodulation reference signals of a resource block in the LTE-Advanced Release-10 standard.

In the LTE-Advanced Release-10 standard, at most eight layers of data can be multiplexed on one resource block. As shown in FIG. 8, the demodulation reference signals in the first to fourth layers of the resource block and the demodulation reference signals in the fifth to eighth layers of the resource block are located on adjacent sub-carriers. When the number of multiplexed layers is over four layers (for example, the number of multiplexed layers is five to eight layers), Walsh sequences with the length of four chips can be used to multiplex the demodulation reference signals in the first to fourth layers and the demodulation reference signals in the fifth to eighth layers respectively. In FIG. 8, it is Frequency Division Multiplexing (FDM) that is performed between the demodulation reference signals in the first to the fourth layers and the demodulation reference signals in the fifth to the eighth layers, that is, they are located on different sub-carriers respectively. The multiplexing manner (mapping manner) for the demodulation reference signals in the first to the fourth layers may also be applied to the multiplexing of the demodulation reference signals in the fifth to the eighth layers. For a case that the number of multiplexed layers is multiple layers in the Release-10, the problem that distributions of the peak values and the zero values are not even as described above still exists.

Figure 9:
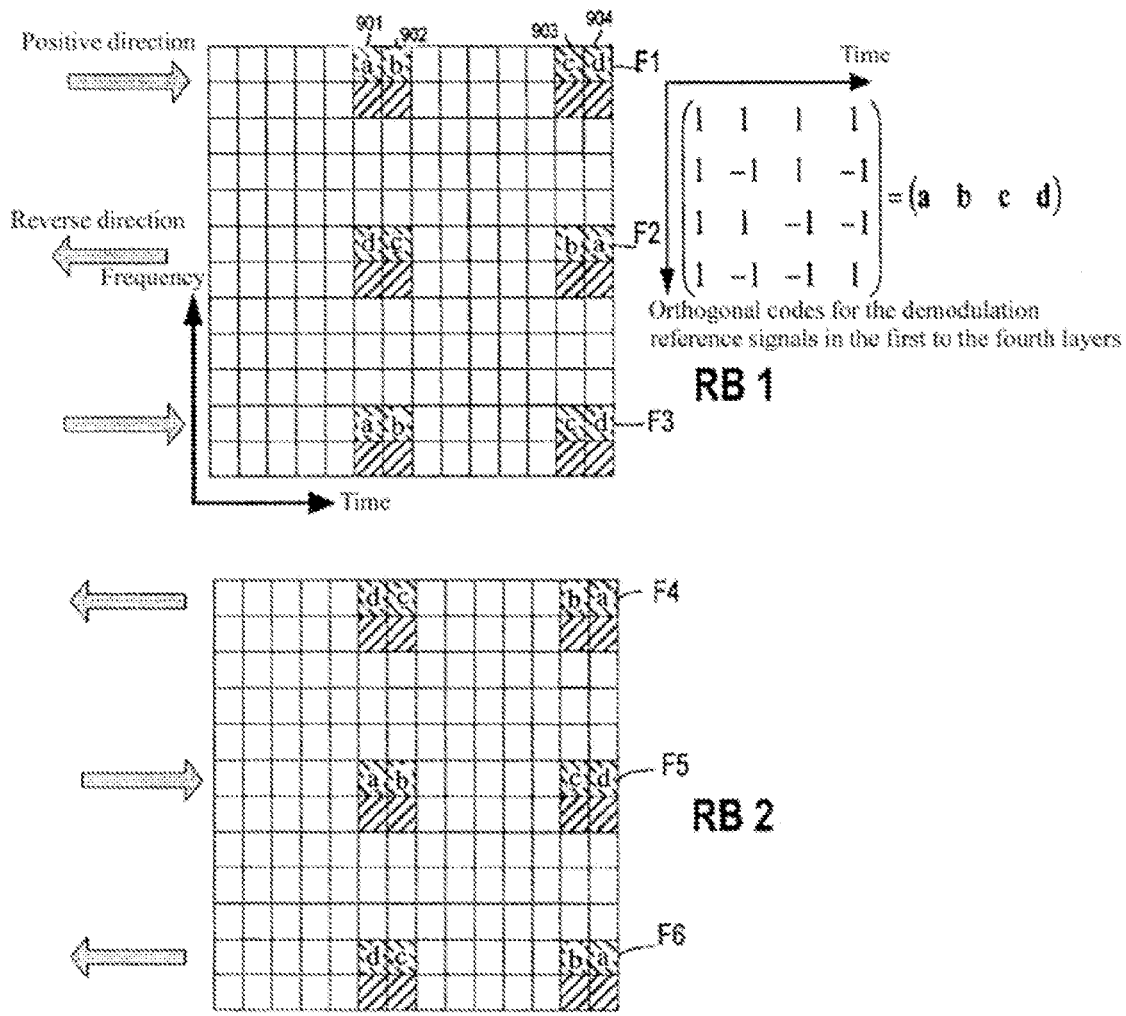
FIG. 9 is a diagram showing that different sub-carriers are reversely multiplexed, alternately in the time direction.

FIG. 9 is a diagram showing that the alternating reverse multiplexing is performed in the time direction for different sub-carriers.

In FIG. 9, on the right side, there is shown an orthogonal matrix with the code length of 4, that is, a Walsh orthogonal code matrix $$A \begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

The matrix contains four rows and four columns of chips, with four chips of each column corresponding to respective demodulation reference signals in the first to the fourth layers respectively. According to the resolution of Release-9, the mapping directions of Walsh codes are alternately reverse on the frequency domain.

Specifically, on a first sub-carrier F1, four demodulation reference signals in the first layer are multiplied by four chips from the first column to the fourth column in the first row of the orthogonal matrix respectively, that is, [1, 1, 1, 1], in the positive direction (the direction from the left to the right as shown here) of the time axis. Four demodulation reference signals in the second layer are multiplied by four chips from the first column to the fourth column in the second row of the orthogonal matrix respectively, that is, [1, −1, 1, −1], in the positive direction of the time axis. Four demodulation reference signals in the third layer are multiplied by four chips from the first column to the fourth column in the third row of the orthogonal matrix respectively, that is, [1, 1, −1, −1], in the positive direction of the time axis. Four demodulation reference signals in the fourth layer are multiplied by four chips from the first column to the fourth column in the fourth row of the orthogonal matrix respectively, that is, [1, −1, −1, 1], in the positive direction of the time axis. At this time, on the first sub-carrier F1, the superposed values of the demodulation reference signals located at the same time and frequency positions in the first to the fourth layers of the resource block are a, b, c, d in the positive direction of the time axis respectively. If the pre-coding factors for the demodulation reference signals in the first to the fourth layers of the resource block are the same, it can be found that, on the first sub-carrier, the superposed value "a" located at the OFDM symbol 901 is the largest peak value, while the superposed values located at other OFDM symbols 902, 903 and 904 are zero.

On a second sub-carrier F2, four demodulation reference signals in the first layer are respectively multiplied by four chips from the first column to the fourth column in the first row of the orthogonal matrix, that is, [1, 1, 1, 1], in the reverse direction (the direction from the right to the left as shown here) of the time axis. Four demodulation reference signals in the second layer are respectively multiplied by four chips from the first column to the fourth column in the second row of the orthogonal matrix, that is, [1, −1, 1, −1], in the reverse direction of the time axis. Four demodulation reference signals in the third layer are respectively multiplied by four chips from the first column to the fourth column in the third row of the orthogonal matrix, that is, [1, 1, −1, −1], in the reverse direction of the time axis. Four demodulation reference signals in the fourth layer are respectively multiplied by four chips from the first column to the fourth column in the fourth row of the orthogonal matrix, that is, [1, −1, −1, 1], in the reverse direction of the time axis. At this time, on the second sub-carrier F2, the superposed values of the demodulation reference signals located at the same time and frequency positions in the first to the fourth layers of the resource block are respectively d, c, b, a in the positive direction of the time axis. If the pre-coding factors for the demodulation reference signals in the first to the fourth layers of the resource block are the same, it can be found that, on the second sub-carrier, the superposed value "a" located at the OFDM symbol 904 is the largest peak value, while the superposed values located at other OFDM symbols 901, 902 and 903 are zero.

For a third sub-carrier F3, a fourth sub-carrier F4, a fifth sub-carrier F5 and a sixth sub-carrier F6 and the like, the above process on the first sub-carrier F1 and the second sub-carrier F2 is repeated respectively.

The multiplexing manner as shown in FIG. 9 has two advantages. The one is that the forward compatibility for the Release-9 is kept: the first and the second layers of demodulation reference signals keep the property of alternating reverse on the frequency domain of the Release-9. The other is that there are orthogonal properties on the time domain and on the frequency domain simultaneously, so that the de-multiplexing can be performed through the orthogonal property of the frequency domain when the orthogonal property of the time domain is destroyed (selectively fading on the time domain).

However, it can also be seen that, in the above multiplexing (mapping) manner, if the pre-coding factors for the demodulation reference signals in the first to the fourth layers of the resource block are the same, for any sub-carrier containing the demodulation reference signals, the largest superposed peak value "a" appears only on the OFDM symbol 901 and the OFDM symbol 904, and the superposed values located at other OFDM symbols 902 and 903 are zero. In such a mapping manner, the effect of averaging the peak values and the zero values is not good, and it still causes the power fluctuation on the time (between different OFDM symbols) larger, which disadvantages the usage efficiency of the power amplifier at the base station side. Therefore, an improvement of the mapping manner as shown in FIG. 9 is still needed. The improvement of the mapping manner as shown in FIG. 9 should meet the following three conditions simultaneously: 1. the peak values and zero values can be averaged on the time domain; 2. the forward compatibility of Release-9 can be kept, that is, the first and the second layers of demodulation reference signals use the mapping manner of Release-9; 3. the dual-orthogonality on the time domain and the frequency domain is possessed.

In the present disclosure, although the first sub-carrier F1 and the second sub-carrier F2 and the like are not absolutely adjacent sub-carriers on a resource block, and there are other sub-carriers transferring data therebetween, they are adjacent in the sub-carriers modulated with the demodulation reference signals. Thus, they are referred to as "adjacent sub-carriers" carrying the demodulation reference signals below.

The present disclosure provides orthogonal codes based code division multiplexing method and a code division multiplexing device and de-multiplexing device by using such a method in a wireless communication system. The orthogonal codes based multiplexing method provided by the present disclosure has characteristics as follows: the demodulation reference signals in different layers can use different mapping manners, that is, they use different orthogonal matrices. However, in FIG. 9, the demodulation reference signals in different layers use the same mapping manner on the same sub-carrier, and they use different mapping manners only on different sub-carriers.

(First Embodiment)

Figure 10:
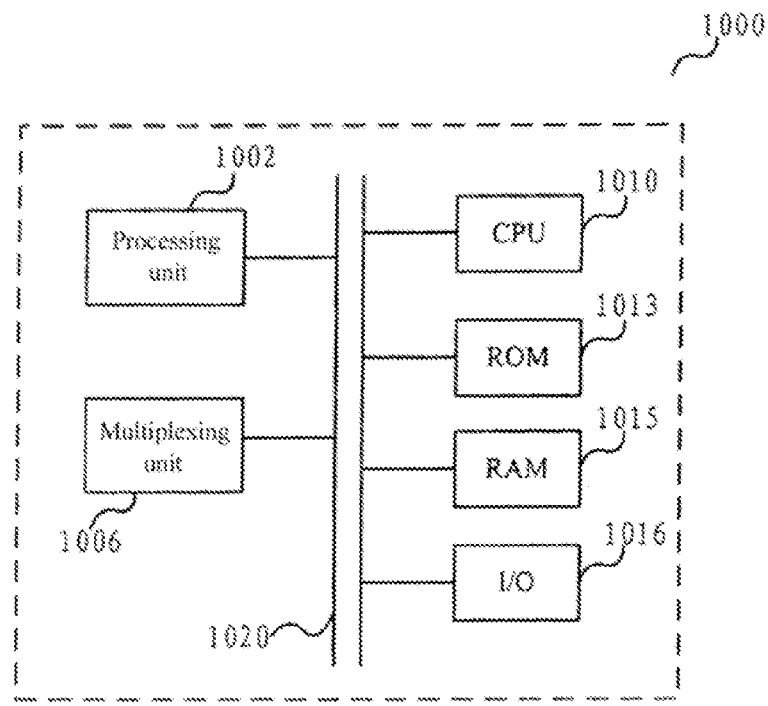
FIG. 10 is a block diagram showing a code division multiplexing device of a wireless communication system according to a first embodiment of the present disclosure.

FIG. 10 is a block diagram showing a code division multiplexing device of a wireless communication system according to a first embodiment of the present disclosure.

As shown in FIG. 10, a code division multiplexing device 1000 according to the present disclosure includes a processing unit 1002 and a multiplexing unit 1006 connected with each other.

The code division multiplexing device 1000 according to the present disclosure may also include: a Central Processing Unit (CPU) 1010 for executing related programs to process various data and to control operations of the respective units in the device 1000; a Read Only Memory (ROM) 1013 for storing various programs required for the CPU 1010 to perform various process and control; a Random Access Memory (RAM) 1015 for storing intermediate data temporarily produced by the CPU 1010 in the procedure of process and control; a Input/Output (I/O) unit 1016 for connecting with external devices, transporting various data between the external devices and the code division multiplexing device 1000 and so on. The above processing unit 1002, multiplexing unit 1006, CPU 1010, ROM 1013, RAM 1015, I/O unit 1016, etc. may be connected via a data and/or command bus 1020, and they transfer signals between one another.

The respective units as described above do not limit the scope of the present disclosure. According to one embodiment of the present disclosure, the function of either of the processing unit 1002 and the multiplexing unit 1006 may also be realized by functional software in combination with the above CPU 1010, ROM 1013, RAM 1015, I/O unit 1016 and the like. And, the functions of the processing unit 1002 and the multiplexing unit 1006 may also be realized by combining them into one unit.

The code division multiplexing device 1000 of the present disclosure uses an orthogonal matrix such as a Walsh code matrix to perform the code division multiplexing of the demodulation reference signals in multiple layers of the resource block. In the code division multiplexing device 1000 of the present disclosure, the processing unit 1002 changes the order of chips of particular rows of an orthogonal matrix (a first orthogonal matrix) to obtain another orthogonal matrix (a second orthogonal matrix) with the changed order of the chips. The multiplexing unit 1006 multiplies the chips of respective rows of the second orthogonal matrix correspondingly by the demodulation reference signals in the corresponding layers of the resource block in the time direction to obtain the code division multiplexing signals. Here, the particular rows may be all or part of rows of the orthogonal matrix.

It should be noted that the employment of different mapping manners for the demodulation reference signals in different layers on the same sub-carrier is equivalent to the permuting of particular rows or columns of a Walsh matrix (orthogonal matrix), but such operation (permuting) sometimes produces a non-orthogonal matrix.

Figure 11:
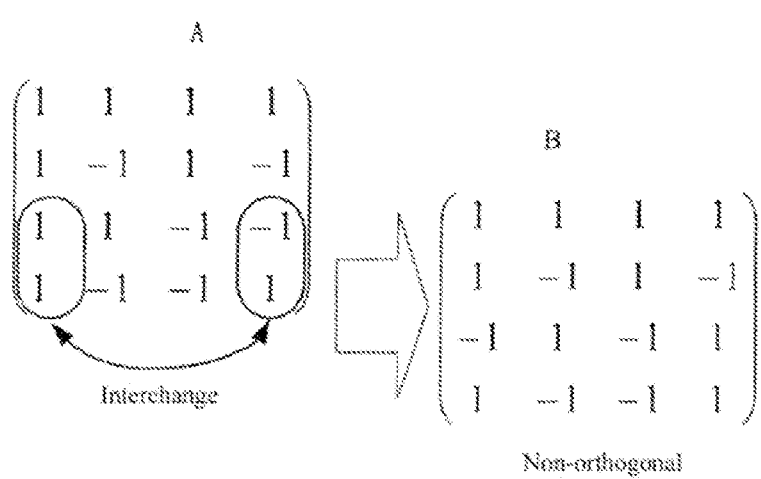
FIG. 11 shows an example that the order of chips of a part of rows in a Walsh matrix is interchanged to produce a non-orthogonal matrix.

FIG. 11 shows an example that the order of chips in the particular rows of a Walsh matrix is changed to produce a non-orthogonal matrix.

In FIG. 11, the first column of chips $$\begin{bmatrix} 1 \\ 1 \end{bmatrix}$$

in the last two rows of an orthogonal matrix A are interchanged with the fourth column of chips $$\begin{bmatrix} -1 \\ 1 \end{bmatrix}$$

in the last two rows of the orthogonal matrix to produce a matrix B. It can be seen that the matrix B is a non-orthogonal matrix. In the present disclosure, such a case should be avoided.

In the present disclosure, the orthogonal property of the demodulation reference signals in different layers on the time domain should be assured at first.

Figure 12:
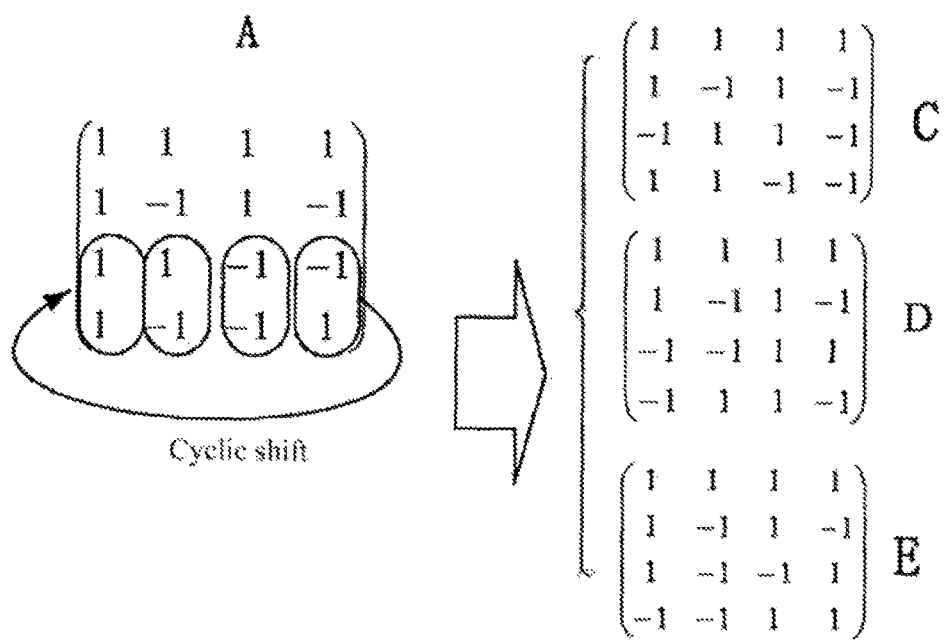
FIG. 12 shows an example that the order of chips of a part of rows in a Walsh matrix is shifted cyclically to produce an orthogonal matrix.

FIG. 12 shows an example that the chips in the particular rows of a Walsh matrix are shifted cyclically to produce an orthogonal matrix.

If the columns of chips in the last two rows of the Walsh matrix A are shifted cyclically, the orthogonal matrices will be produced as shown in FIG. 12. In FIG. 12, the first to fourth columns of chips in the last two rows of the orthogonal matrix A are shifted cyclically by one column in the positive direction of the time axis (it can be considered as a direction from the left to the right here), a matrix C on the right side may be obtained; the first to fourth columns of chips in the last two rows of the matrix C are shifted cyclically by one column in the positive direction of the time axis, a matrix D on the right side may be obtained; and the first to fourth columns of chips in the last two rows of the matrix D are shifted cyclically by one column in the positive direction of the time axis, a matrix E on the right side may be obtained. It can be seen that the matrices C, D and E are all orthogonal matrices.

Here, it is noted that the orthogonal E equals to a matrix obtained by shifting cyclically the first to fourth columns of chips in the last two rows of the orthogonal matrix A by one column in the reverse direction of the time axis.

According to an embodiment of the present disclosure, the processing unit 1002 may change the order of the chips by shifting cyclically the chips in part of rows of the first orthogonal matrix (the orthogonal matrix A) in the positive or reverse direction of the time axis to obtain the second orthogonal matrix (the orthogonal matrices C, D, E). And, the multiplexing unit 1006 multiplies the demodulation reference signals in the adjacent sub-carriers in respective layers of the resource block by the chips of the first to the last columns of the second orthogonal matrix alternately reverse in the time direction.

The first orthogonal matrix or the second orthogonal matrix according to the present disclosure is not limited to the above situation, and the first orthogonal matrix may be any one of the following orthogonal matrices:

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix}, \begin{bmatrix} 1 & 1 & 1 & 1 \\ 1 & -1 & 1 & -1 \\ -1 & 1 & 1 & -1 \\ 1 & 1 & -1 & -1 \end{bmatrix},$$

$$\begin{bmatrix} 1 & 1 & 1 & 1 \\ 1 & -1 & 1 & -1 \\ -1 & -1 & 1 & 1 \\ 1- & 1 & 1 & -1 \end{bmatrix}, \begin{bmatrix} 1 & 1 & 1 & 1 \\ 1 & -1 & 1 & -1 \\ 1 & -1 & -1 & 1 \\ -1 & -1 & 1 & 1 \end{bmatrix},$$

so the second orthogonal matrix can be other matrix except for the first orthogonal matrix.

Figure 13:
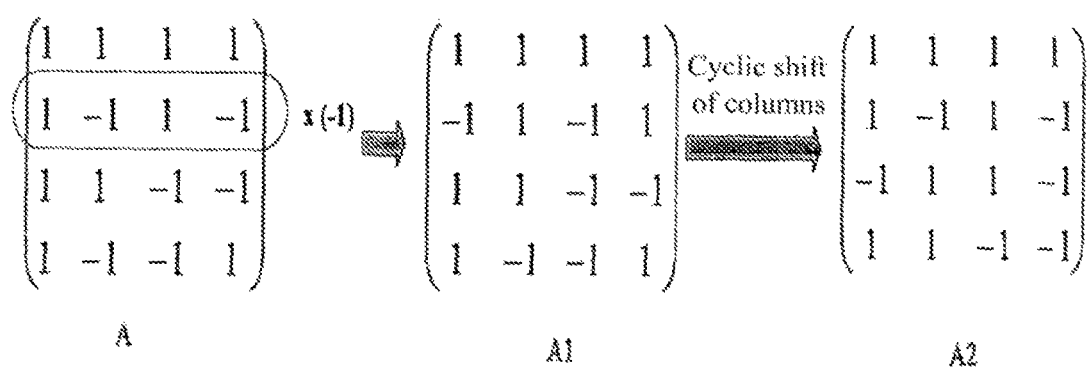
FIG. 13 is a another diagram showing that an orthogonal matrix of the code division multiplexing is obtained according to the present embodiment.

FIG. 13 is another diagram showing an orthogonal matrix for the code division multiplexing according to the present embodiment.

According to an embodiment of the present disclosure, the order of the chips may also be changed by multiplying a part of rows of the first orthogonal matrix by nonzero numbers and shifting cyclically the chips in the respective rows in the positive or reverse direction of the time axis. As shown in FIG. 13, the matrix A (the first orthogonal matrix) is a classic Walsh matrix, and the second row of the matrix A is multiplied by (−1) to obtain a matrix A1 which is an orthogonal matrix. The columns of the matrix A1 are shifted cyclically by one bit toward the right (in the positive direction of the time axis) to obtain a matrix A2 (the second orthogonal matrix). The matrix A2 is the orthogonal matrix C as shown in FIG. 12. According to the same manner, the columns of the matrix A1 are shifted cyclically by one bit toward the left (in the reverse direction of the time axis), and the orthogonal matrix E as shown in FIG. 12 (the second orthogonal matrix) is obtained.

Figures 14, 15:
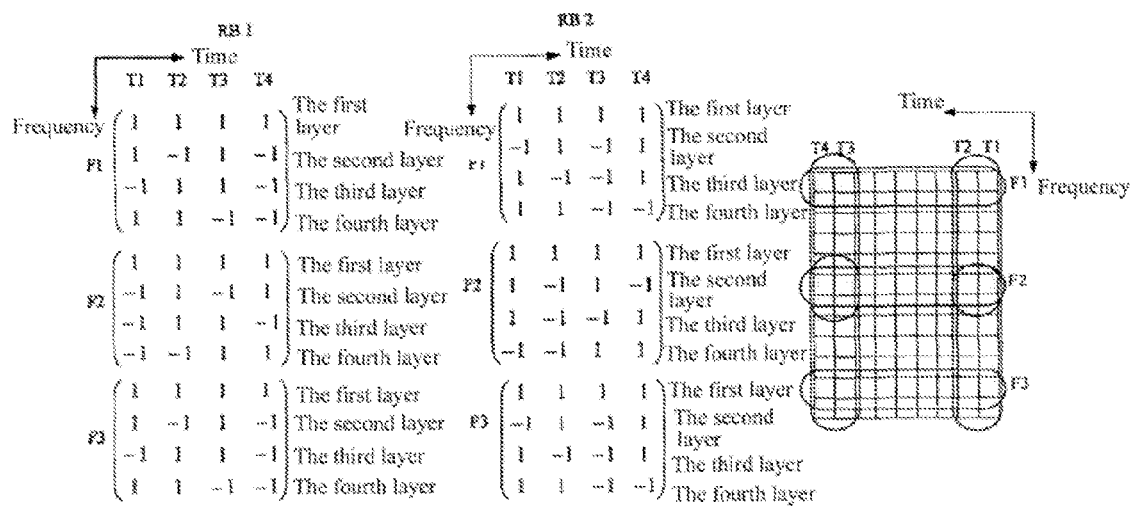
FIG. 14 is a further diagram showing that an orthogonal matrix of the code division multiplexing is obtained according to the present embodiment.
FIG. 15 shows an example of the code division multiplexing based on the orthogonal codes according to an embodiment of the present disclosure.

FIG. 14 is a further diagram showing an orthogonal matrix for the code division multiplexing according to the present embodiment.

As shown in FIG. 14, the matrix A1 obtained by multiplying a certain row or certain rows of the matrix A (the first orthogonal matrix) by nonzero numbers (real numbers or complex numbers), for example, a, b, c shown in FIG. 14 (which may be any nonzero numbers) is still an orthogonal matrix. The matrix A1 is performed with the row or column interchange to obtain the A2 (the second orthogonal matrix). In FIG. 13 and FIG. 14, although the change from A1 to A2 is through the cyclic shift of columns, any interchange and shift of the rows or columns of the A1 produces an orthogonal matrix because the A1 itself is an orthogonal matrix.

According to an embodiment of the present disclosure, the processing unit 1002 may also change the order of the chips by multiplying a part of rows of the first orthogonal matrix (the orthogonal matrix A) by nonzero numbers and then shifting cyclically the chips in the respective rows in the positive or reverse direction of the time axis to obtain the second orthogonal matrix (the orthogonal matrices C, D, E). And, the multiplexing unit 1006 multiplies the demodulation reference signals in the adjacent sub-carriers in respective layers of the resource block by the chips in the first to the last columns of the second orthogonal matrix alternately reverse in the time direction.

It can be seen from the above FIG. 12 to FIG. 14 that any matrix of for example A, C, D, E and the like as described above may be taken as a basic matrix (the first orthogonal matrix), and the chips in the particular rows of the matrix is shifted cyclically to obtain the other orthogonal matrices.

According to an embodiment of the present disclosure, if the orthogonal matrix includes N rows×N columns of chips, and the multiple layers of resource block include N layers of resource block (the demodulation reference signals in the N layers of resource block are located at the same predetermined time and frequency position), the multiplexing unit 1006 may multiply the respective columns of chips in the n-th row of the second orthogonal matrix by the demodulation reference signals in the n-th layer of the resource block correspondingly in the time direction. Here, n=1, ..., N, and N may be a natural number.

FIG. 15 shows an example of the code division multiplexing based on the orthogonal codes according to an embodiment of the present disclosure.

In FIG. 15, it is shown a case of N=4, that is, the orthogonal matrix is an orthogonal matrix of 4×4 orders, and the multiple layers of the resource block include 4 layers of resource block.

Here, a first resource block RB1 is taken as an example. For the demodulation reference signals in the first to the fourth layers of the resource block on the first sub-carrier F1, the chips in the last two rows of the orthogonal matrix A are shifted cyclically by one column in the positive direction of the time axis to obtain the orthogonal matrix C, and the demodulation reference signals in the first to the fourth layers of the resource block on the first sub-carrier F1 are respectively multiplied by the first to the fourth columns of chips of the orthogonal matrix C in the positive direction of the time axis (the direction of T1→T2→T3→T4).

Specifically, for the first sub-carrier F1, the demodulation reference signals in the first layer of the resource block are respectively multiplied by the first to the fourth columns of chips in the first row of the orthogonal matrix C, that is [1, 1, 1, 1], in the positive direction of the time axis. The demodulation reference signals in the second layer of the resource block are respectively multiplied by the first to the fourth columns of chips in the second row of the orthogonal matrix C, that is [1, −1, 1, −1], in the positive direction of the time axis. The demodulation reference signals in the third layer of the resource block are respectively multiplied by the first to the fourth columns of chips in the third row of the orthogonal matrix C, that is [−1, 1, 1, −1], in the positive direction of the time axis. The demodulation reference signals in the fourth layer of the resource block are respectively multiplied by the first to the fourth columns of chips in the fourth row of the orthogonal matrix C, that is [1, 1, −1, −1], in the positive direction of the time axis.

For the demodulation reference signals in the first to the fourth layers of the resource block on the second sub-carrier F2, the chips in the last two rows of the orthogonal matrix A are shifted cyclically by one column in the positive direction of the time axis to obtain the orthogonal matrix C, and the demodulation reference signals in the first to the fourth layers of the resource block on the second sub-carrier F2 are respectively multiplied by the first to the fourth columns of chips of the orthogonal matrix C in the reverse direction of the time axis (the direction of T4→T3→T2→T1).

Specifically, for the second sub-carrier F2, the demodulation reference signals in the first layer of the resource block are respectively multiplied by the first to the fourth columns of chips in the first row of the orthogonal matrix C, that is [1, 1, 1, 1], in the reverse direction of the time axis. The demodulation reference signals in the second layer of the resource block are respectively multiplied by the first to the fourth columns of chips in the second row of the orthogonal matrix C, that is [1, −1, 1, −1], in the reverse direction of the time axis. The demodulation reference signals in the third layer of the resource block are respectively multiplied by the first to the fourth columns of chips in the third row of the orthogonal matrix C, that is [−1, 1, 1, −1], in the reverse direction of the time axis. The demodulation reference signals in the fourth layer of the resource block are respectively multiplied by the first to the fourth columns of chips in the fourth row of the orthogonal matrix C, that is [1, 1, −1, −1], in the reverse direction of the time axis. Here, the multiplication of the demodulation reference signals in the respective layers on the second sub-carrier by the first to the fourth columns of chips of the orthogonal matrix C in the reverse direction of the time axis is equivalent to the multiplication of the demodulation reference signals in the respective layers on the second sub-carrier by the first to the fourth columns of chips of an orthogonal matrix C' in the positive direction of the time axis. The orthogonal matrix C' equals to an orthogonal matrix obtained by arranging the first to the fourth columns of chips of the orthogonal matrix C reversely.

For the demodulation reference signals in the first to the fourth layers of the resource block on the third sub-carrier F3, the same operations as those of the demodulation reference signals in the first to the fourth layers of the resource block on the first sub-carrier F1 are repeated.

According to an embodiment of the present disclosure, the following code division multiplexing manner may also be employed.

Here, a second resource block RB2 is taken as an example. For the demodulation reference signals in the first to the fourth layers of the resource block on the first sub-carrier F1, the chips in the last two rows of the orthogonal matrix A are shifted cyclically by one column in the reverse direction of the time axis to obtain the orthogonal matrix E, and the demodulation reference signals in the first to the fourth layers of the resource block on the first sub-carrier F1 are respectively multiplied by the first to the fourth columns of chips of the orthogonal matrix E in the reverse direction of the time axis (the direction of T4→T3→T2→T1).

Specifically, for the first sub-carrier F1, the demodulation reference signals in the first layer of the resource block are respectively multiplied by the first to the fourth columns of chips in the first row of the orthogonal matrix E, [1, 1, 1, 1], in the reverse direction of the time axis. The demodulation reference signals in the second layer of the resource block are respectively multiplied by the first to the fourth columns of chips in the second row of the orthogonal matrix E, [1, −1, 1, −1], in the reverse direction of the time axis. The demodulation reference signals in the third layer of the resource block are respectively multiplied by the first to the fourth columns of chips in the third row of the orthogonal matrix E, [1, −1, −1, 1], in the reverse direction of the time axis. The demodulation reference signals in the fourth layer of the resource block are respectively multiplied by the first to the fourth columns of chips in the fourth row of the orthogonal matrix E, [−1, −1, 1, 1], in the reverse direction of the time axis. Here, the multiplication of the demodulation reference signals in respective layers on the first sub-carrier by the first to the fourth columns of chips of the orthogonal matrix E in the reverse direction of the time axis is equivalent to the multiplication of the demodulation reference signals in respective layers on the first sub-carrier by the first to the fourth columns of chips of an orthogonal matrix E' in the positive direction of the time axis. The orthogonal matrix E' equals to an orthogonal matrix obtained by arranging the first to the fourth columns of chips of the orthogonal matrix E reversely.

For the demodulation reference signals in the first to the fourth layers of the resource block on the second sub-carrier F2, the chips in the last two rows of the orthogonal matrix A are shifted cyclically by one column in the reverse direction of the time axis to obtain the orthogonal matrix E, and the demodulation reference signals in the first to the fourth layers of the resource block on the second sub-carrier F2 are respectively multiplied by the first to the fourth columns of chips of the orthogonal matrix E in the positive direction of the time axis (the direction of T1→T2→T3→T4).

Specifically, for the second sub-carrier F2, the demodulation reference signals in the first layer of the resource block are respectively multiplied by the first to the fourth columns of chips in the first row of the orthogonal matrix E, [1, 1, 1, 1], in the positive direction of the time axis. The demodulation reference signals in the second layer of the resource block are respectively multiplied by the first to the fourth columns of chips in the second row of the orthogonal matrix E, [1, −1, 1, −1], in the positive direction of the time axis. The demodulation reference signals in the third layer of the resource block are respectively multiplied by the first to the fourth columns of chips in the third row of the orthogonal matrix E, [1, −1, −1, 1], in the positive direction of the time axis. The demodulation reference signals in the fourth layer of the resource block are respectively multiplied by the first to the fourth columns of chips in the fourth row of the orthogonal matrix E, [−1, −1, 1, 1], in the positive direction of the time axis.

For the demodulation reference signals in the first to the fourth layers of the resource block on the third sub-carrier F3, the same operations as those of the demodulation reference signals in the first to the fourth layers of the resource block on the first sub-carrier F1 are repeated.

Figure 16:
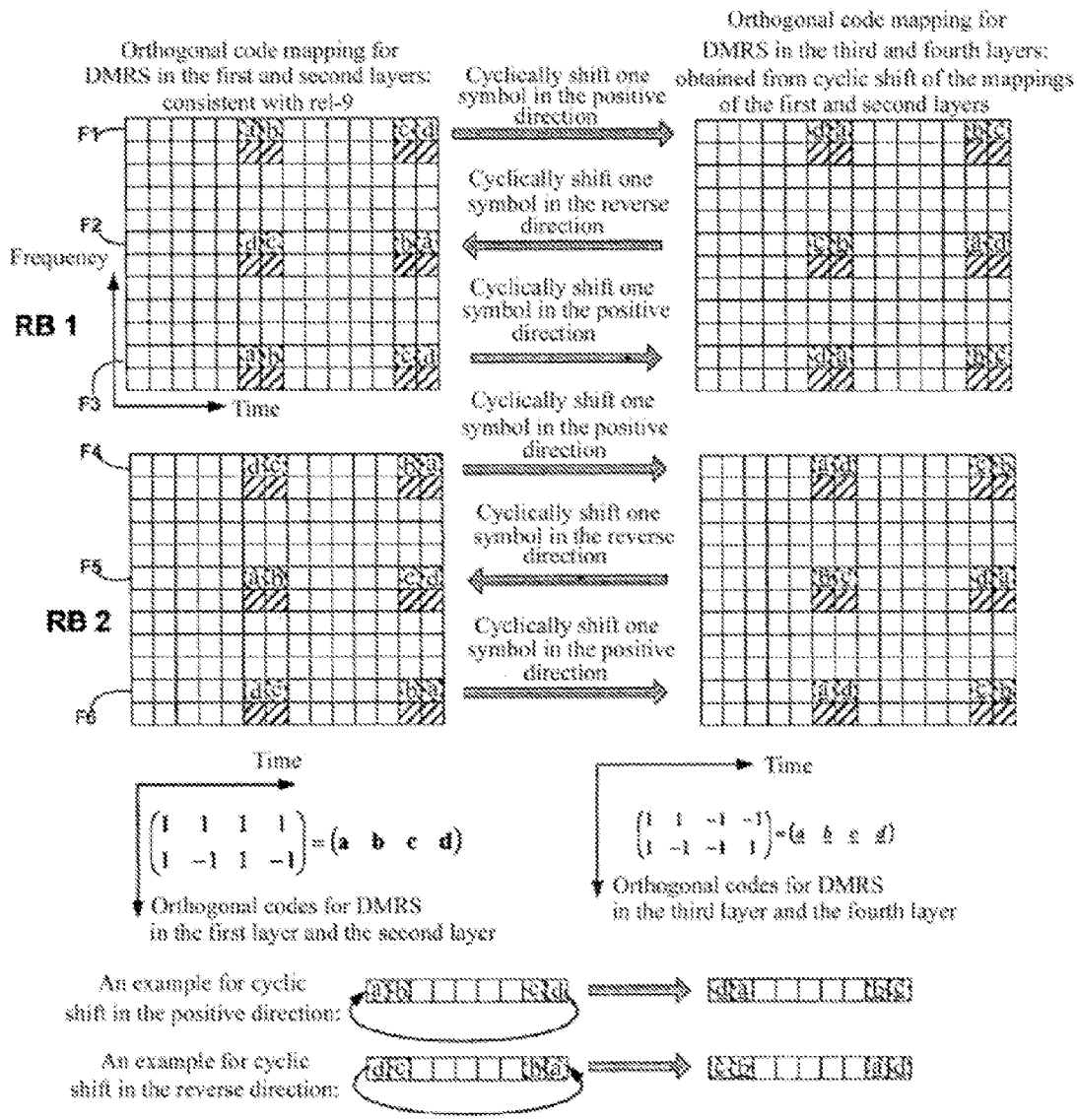
FIG. 16 shows an example shown on a resource block, in which the cyclic shift is performed for an orthogonal multiplexing manner of the present disclosure.

FIG. 16 shows an example shown on a resource block, in which the cyclic shift is performed for an orthogonal multiplexing manner of the present disclosure.

In FIG. 16, for the demodulation reference signals in the first and the second layers of the resource block, the mapping is performed by using an orthogonal matrix X, and it reverses alternately on adjacent sub-carriers such as the first sub-carrier F1, the second sub-carrier F2, the third sub-carrier F3, the fourth sub-carrier F4, the fifth sub-carrier F5, the sixth sub-carrier F6 and the like, which is consistent with the manner in the Release-9. For the demodulation reference signals in the third and the fourth layers of the resource block, the mapping is performed by cyclically shifting the respective columns of chips of an orthogonal matrix Y. Here, the orthogonal matrix X is composed of the first and the second rows of chips of the orthogonal matrix A shown in FIG. 11 and FIG. 12, and the orthogonal matrix Y is composed of the third and the fourth rows of chips of the orthogonal matrix A shown in FIG. 11 and FIG. 12.

Specifically, for the first sub-carrier F1, the mapping manner of a, b, c, d for the demodulation reference signals in the first layer and the second layer is cyclically shifted by one OFDM symbol in the positive direction of the time axis, and the mapping manner of d, a, b, c for the demodulation reference signals in the third layer and the fourth layer is obtained.

For the second sub-carrier F2, the mapping manner of d, a, b, c for the demodulation reference signals in the first layer and the second layer is cyclically shifted by one OFDM symbol in the reverse direction of the time axis, and the mapping manner of c, b, a, d for the demodulation reference signals in the third layer and the fourth layer is obtained.

For the third sub-carrier F3, the mapping manner of a, b, c, d for the demodulation reference signals in the first layer and the second layer is cyclically shifted by one OFDM symbol in the positive direction of the time axis, and the mapping manner of d, a, b, c for the demodulation reference signals in the third layer and the fourth layer is obtained.

For the fourth sub-carrier F4, the mapping manner of d, c, b, a for the demodulation reference signals in the first layer and the second layer is cyclically shifted by one OFDM symbol in the positive direction of the time axis, and the mapping manner of a, d, c, b for the demodulation reference signals in the third layer and the fourth layer is obtained.

For the fifth sub-carrier F5, the mapping manner of a, b, c, d for the demodulation reference signals in the first layer and the second layer is cyclically shifted by one OFDM symbol in the reverse direction of the time axis, and the mapping manner of b, c, d, a for the demodulation reference signals in the third layer and the fourth layer is obtained.

For the sixth sub-carrier F6, the mapping manner of d, c, b, a for the demodulation reference signals in the first layer and the second layer is cyclically shifted by one OFDM symbol in the positive direction of the time axis, and the mapping manner of a, d, c, b for the demodulation reference signals in the third layer and the fourth layer is obtained.

The above cyclic shift of the mapping manners of the demodulation reference signals in different layers on different sub-carriers shown in the resource block equals to that, as shown in FIG. 15, the chips in the third row and the fourth row of the orthogonal matrix A are cyclically shifted in the time direction, that is, the chips in the last two columns of the orthogonal matrix A are cyclically shifted by one column in the positive or reverse direction of the time axis to obtain the orthogonal matrices C and E, and the demodulation reference signals in the first to the fourth layers of the resource block on the adjacent sub-carriers are respectively multiplied by the chips in the first to the fourth columns of the orthogonal matrices C and E in the positive or reverse direction of the time axis.

According to an embodiment of the present disclosure, the mapping manner of the first and the second layers is consistent with the mapping manner of the Release-9, thus the forward compatibility is assured. On each sub-carrier, there is correspondence between the mapping manner of the first and second layers and the mapping manner of the third and fourth layers. In FIG. 16, on the first sub-carrier, the mapping manner for the demodulation reference signals in the first and the second layers are cyclically shifted by one OFDM symbol in the positive direction of the time axis, and the mapping manner for the demodulation reference signals in the third and the fourth layers on this sub-carrier is obtained. In the next sub-carrier, the mapping manner for the first and the second layers is shifted by one OFDM symbol in the reverse direction, and the mapping manner for the third and the fourth layers can be obtained. By the same way, the mapping manners of the third and the fourth layers in the remaining sub-carriers can be obtained. Since the demodulation reference signals corresponding to the first, second, third and fourth layers are multiplexed on the same time and frequency resource, such different mapping manners for the demodulation reference signals in the first, second, third and fourth layers is equivalent to that the chips in the last two rows of a Walsh matrix (an orthogonal matrix) are cyclically shifted as shown in FIG. 15. The orthogonal property on the time domain and the frequency domain of the mapping manners of the present embodiment may be shown in FIG. 17.

Figure 17:
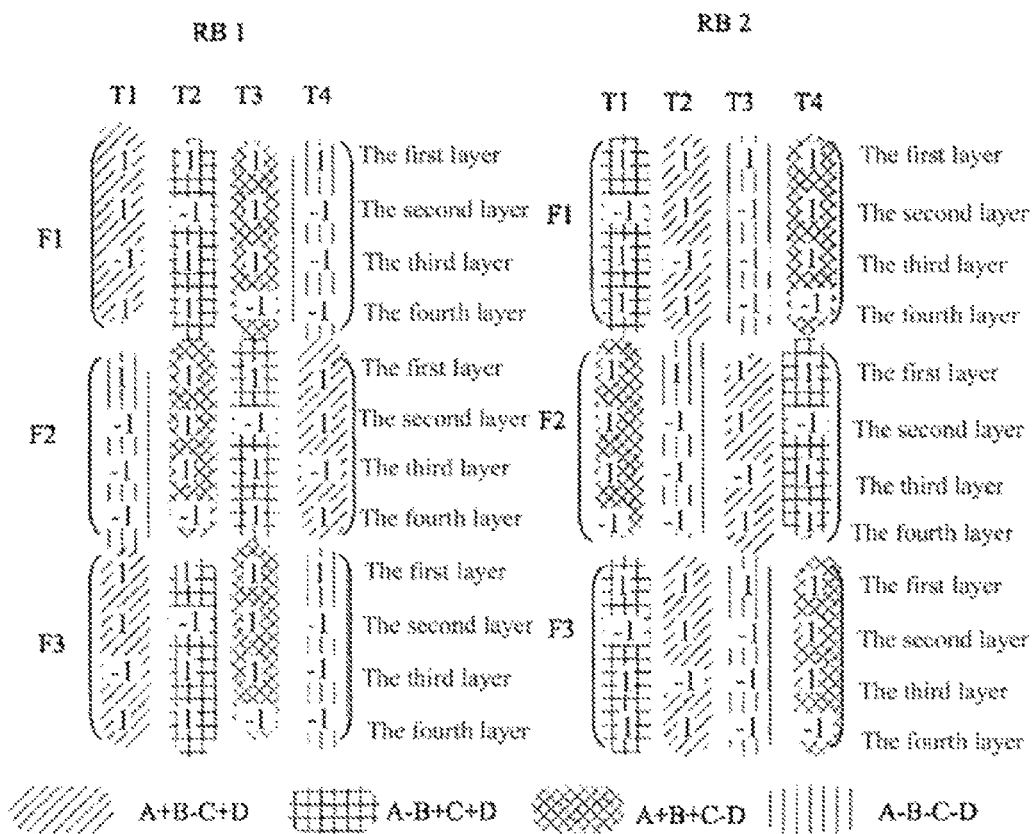
FIG. 17 is a diagram showing the effect of the code division multiplexing manner based on the orthogonal codes of the present disclosure.

FIG. 17 is a diagram shown the effect of the code division multiplexing manner based on the orthogonal codes of the present disclosure.

In FIG. 17, the equalizing function for power peak values of the present embodiment is shown. It is assumed that real values for the demodulation reference signals in different layers (the first to fourth layers) are A, B, C and D (A, B, C, D may be any complex numbers) respectively, and in FIG. 17, the different shadows represent possible different power values. Each shadow is assigned to four OFDM symbols in the mapping manners provided by the present embodiment. It can be distinctly illustrated from the quantitative analysis below that the manners provided by the present embodiment is able to resolve the equalizing problem of the power peak values. By superposing the powers of the demodulation reference signals on the six sub-carriers in the first resource block RB1 and the second resource block RB2 in FIG. 17, the total power of each OFDM symbol (T1~T4) may be obtained: the accumulated powers on T1 and T2 are identical, i.e. $6(|A|^2+|B|^2+|C|^2+|D|^2)+2(AD^*+DA^*)-2(BC^*+CB^*)$; the accumulated powers on T3 and T4 are identical, i.e. $6(|A|^2+|B|^2+|C|^2+|D|^2)-2(AD^*+DA^*)+2(BC^*+CB^*)$. In the above calculation, $|A|$ represents the modulus value of the complex number A, and $A^*$ represents the conjugate of the complex number A. It is assumed that by using the method of alternately reversing on the time domain as shown in FIG. 9, the power accumulation values on such four OFDM symbols of T1~T4 can be obtained by calculation similarly: the accumulated powers on T1 and T4 are identical, i.e. $6(|A|^2+|B|^2+|C|^2+|D|^2)+6(AD^*+DA^*)+6(BC^*+CB^*)$; the accumulated powers on T2 and T3 are identical, i.e. $6(|A|^2+|B|^2+|C|^2+|D|^2)-6(AD^*+DA^*)-6(BC^*+CB^*)$. In the above power accumulation values, the term of $6(|A|^2+|B|^2+|C|^2+|D|^2)$ is in common, so the power fluctuation is mainly dependent on the cross-multiplication terms of A, B, C, D. In the calculation of the present embodiment, the factors before the corresponding cross-multiplication terms are 2; in contrast, in the calculation of the method as shown in FIG. 9, the factors before the corresponding cross-multiplication terms are 6. Consequently, the present embodiment can effectively average the power of peak values. Finally, the efficiency of the present embodiment may also be verified by using a simple example. It is assumed that A=B=C=D. It can be obtained from the above calculation that the accumulated power on T1~T4 are all $6(|A|^2+|B|^2+|C|^2+|B|^2)$ in the present embodiment, however, in the method as shown in FIG. 9, the accumulated power on T1 and T4 are $12(|A|^2+|B|^2+|C|^2+|D|^2)$, and the accumulated power on T2 and T3 are both zero.

Therefore, the present embodiment can effectively eliminate a problem of jitter on the time domain of the transmission power of a base station; meanwhile, the mapping method possesses the dual-orthogonality on the time domain and the frequency domain, and it can keep the forward compatibility of 3GPP LTE-Advanced Release-9 standard, and especially improves the usage efficiency of the power amplifier at the base station side.

The manner of the code division multiplexing of the demodulation reference signals in N layers (the first to fourth layers) of a resource block is described above. According to an embodiment of the present disclosure, there may also be included further N layers of the resource block, the demodulation reference signals in which are located at the predetermined time and frequency positions different from the demodulation reference signals in the N layers of the resource block as described above.

The manner of the code division multiplexing based on the orthogonal codes of the demodulation reference signals in the fifth to the eighth layers of the resource block may be performed by employing the same processing manner as the first to the fourth layers of the resource block.

(Second Embodiment)

Figure 18:
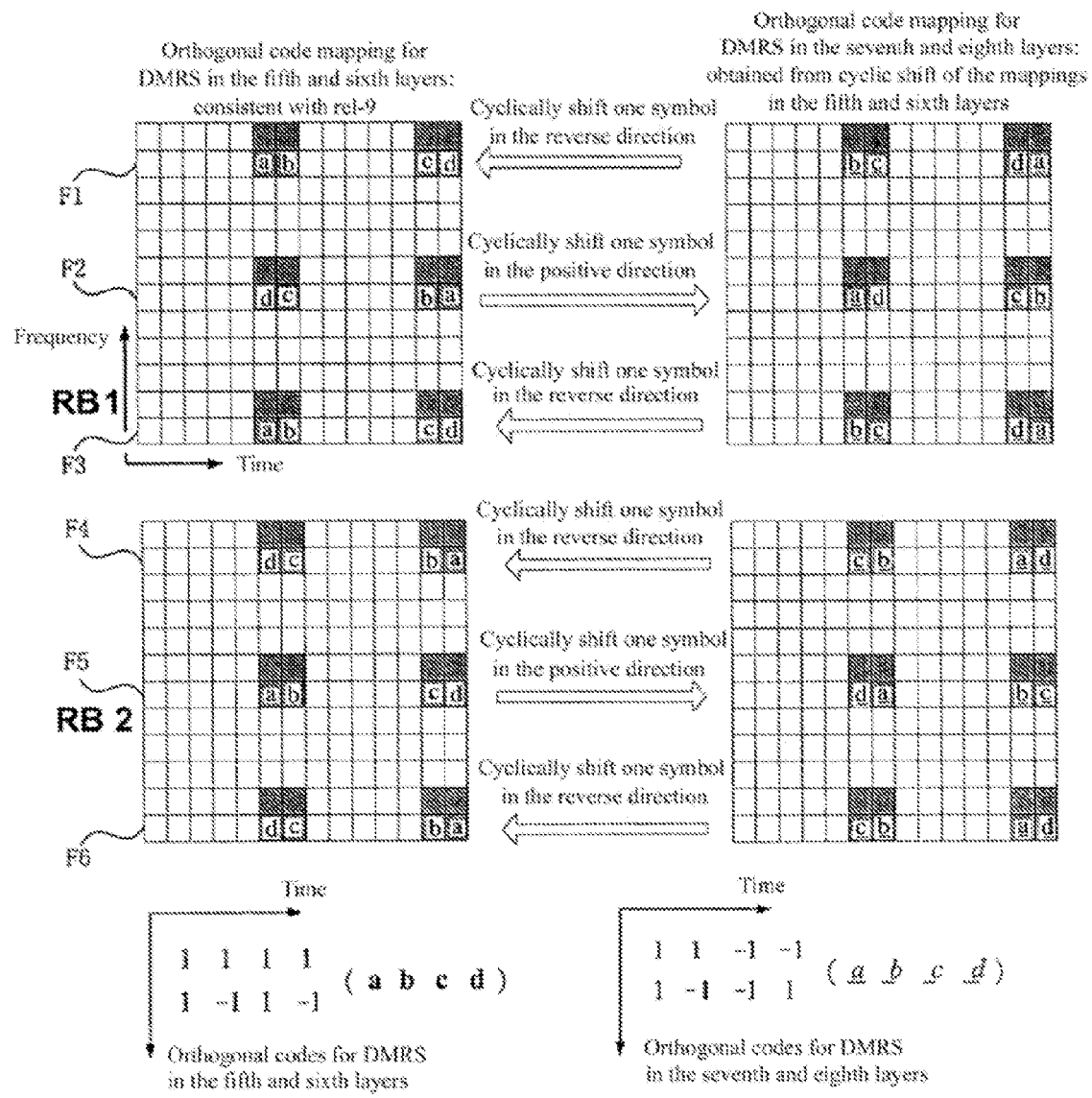
FIG. 18 shows a code division multiplexing manner of the demodulation reference signals in the fifth to eighth layers of resource blocks according to a second embodiment of the present disclosure.

FIG. 18 shows a code division multiplexing manner of the demodulation reference signals in the five to eight layers of a resource block according to a second embodiment of the present disclosure.

In the present embodiment, the demodulation reference signals in the eight layers of data (resource block) are distributed on two adjacent sub-carriers, as shown in FIG. 8. The first embodiment aims to a case that four layers of the demodulation reference signals are assigned on one sub-carrier, which does not relate to the case of the demodulation reference signals assigned on two adjacent sub-carriers. When the mapping manner in the fifth to the eighth layers of the demodulation reference signals is designed, one simple method is to use repeatedly the mapping manner of the first to the fourth layers, such as the method in the first embodiment. However, in fact, the reference signals in the fifth to the eighth layers may also use a mapping manner different from the first to the fourth layers, and the present embodiment gives one example different from the mapping manner of the first to the fourth layers. According to the present embodiment, the demodulation reference signals in the fifth to the eighth layers and the demodulation reference signals in the first to the fourth layers employ different mapping manners. In FIG. 18, only the mapping manner of the fifth to the eighth layers is given, and the mapping manner of the first to the fourth layers is the same as the first embodiment.

As shown in FIG. 18, the demodulation reference signals in the fifth and the sixth layers of the resource block are mapped by using an orthogonal matrix X, and it reverses alternately on the adjacent sub-carriers modulated with the demodulation reference signals such as the first sub-carrier F1, the second sub-carrier F2, the third sub-carrier F3, the fourth sub-carrier F4, the fifth sub-carrier F5, the sixth sub-carrier F6 and the like, which is consistent with the manner in Release-9. For the demodulation reference signals in the seventh and the eighth layers of the resource block, the mapping is performed by cyclically shifting the respective columns of chips of an orthogonal matrix Y. Here, the orthogonal matrix X is composed of the first and second rows of chips of the orthogonal matrix A as shown in FIG. 11 and FIG. 12, and the orthogonal matrix Y is composed of the third and fourth rows of chips of the orthogonal matrix A as shown in FIG. 11 and FIG. 12.

Specifically, for the first sub-carrier F1, the mapping manner of a, b, c, d for the demodulation reference signals in the fifth layer and the sixth layer is cyclically shifted by one OFDM symbol in the reverse direction of the time axis, and the mapping manner of b, c, d, a for the demodulation reference signals in the seven layer and the eighth layer is obtained.

For the second sub-carrier F2, the mapping manner of d, c, b, a for the demodulation reference signals in the fifth layer and the sixth layer is cyclically shifted by one OFDM symbol in the positive direction of the time axis, and the mapping manner of a, d, c, b for the demodulation reference signals in the seventh layer and the eighth layer is obtained.

For the third sub-carrier F3, the mapping manner of a, b, c, d for the demodulation reference signals in the fifth layer and the sixth layer is cyclically shifted by one OFDM symbol in the reverse direction of the time axis, and the mapping manner of b, c, d, a for the demodulation reference signals in the seventh layer and the eighth layer is obtained.

For the fourth sub-carrier F4, the mapping manner of d, c, b, a for the demodulation reference signals in the fifth layer and the sixth layer is cyclically shifted by one OFDM symbol in the reverse direction of the time axis, and the mapping manner of c, b, a, d for the demodulation reference signals in the seventh layer and the eighth layer is obtained.

For the fifth sub-carrier F5, the mapping manner of a, b, c, d for the demodulation reference signals in the fifth layer and the sixth layer is cyclically shifted by one OFDM symbol in the positive direction of the time axis, and the mapping manner of d, a, b, c for the demodulation reference signals in the seventh layer and the eighth layer is obtained.

For the sixth sub-carrier F6, the mapping manner of d, c, b, a for the demodulation reference signals in the fifth layer and the sixth layer is cyclically shifted by one OFDM symbol in the reverse direction of the time axis, and the mapping manner of c, b, a, d for the demodulation reference signals in the seventh layer and the eighth layer is obtained.

The above cyclic shift of the mapping manners of the demodulation reference signals in different layers on different sub-carriers as shown in the fifth to the eighth layers of the resource block is equivalent to the following manner.

Here, a first resource block RB1 is taken as an example. For the demodulation reference signals in the fifth to the eighth layers of the resource block on the first sub-carrier F1, the chips in the last two rows of the orthogonal matrix A are shifted cyclically by one column in the reverse direction of the time axis to obtain the orthogonal matrix E, and the demodulation reference signals in the fifth to the eighth layers of the resource block on the first sub-carrier F1 are respectively multiplied by the first to the fourth columns of chips of the orthogonal matrix E in the positive direction of the time axis (the direction of T1→T2→T3→T4, that is, a direction from the left to the right).

Specifically, for the first sub-carrier F1, the demodulation reference signals in the fifth layer of the resource block are respectively multiplied by the first to the fourth columns of chips in the first row of the orthogonal matrix E, [1, 1, 1, 1], in the positive direction of the time axis. The demodulation reference signals in the sixth layer of the resource block are respectively multiplied by the first to the fourth columns of chips in the second row of the orthogonal matrix E, [1, −1, 1, −1], in the positive direction of the time axis. The demodulation reference signals in the seventh layer of the resource block are respectively multiplied by the first to the fourth columns of chips in the third row of the orthogonal matrix E, [1, −1, −1, 1], in the positive direction of the time axis. The demodulation reference signals in the eighth layer of the resource block are respectively multiplied by the first to the fourth columns of chips in the fourth row of the orthogonal matrix E, [−1, −1, 1, 1], in the positive direction of the time axis.

For the demodulation reference signals in the fifth to the eighth layers of the resource block on the second sub-carrier F2, the chips in the last two rows of the orthogonal matrix A are shifted cyclically by one column in the reverse direction of the time axis to obtain the orthogonal matrix E, and the demodulation reference signals in the fifth to the eighth layers of the resource block on the second sub-carrier F2 are respectively multiplied by the first to the fourth columns of chips of the orthogonal matrix E in the reverse direction of the time axis (the direction of T4→T3→T2→T1, that is, a direction from the right to the left). Specifically, for the second sub-carrier F2, the demodulation reference signals in the fifth layer of the resource block are respectively multiplied by the first to the fourth columns of chips in the first row of the orthogonal matrix E, [1, 1, 1, 1], in the reverse direction of the time axis, the demodulation reference signals in the sixth layer of the resource block are respectively multiplied by the first to the fourth columns of chips in the second row of the orthogonal matrix E, [1, −1, 1, −1], in the reverse direction of the time axis, the demodulation reference signals in the seventh layer of the resource block are respectively multiplied by the first to the fourth columns of chips in the third row of the orthogonal matrix E, [1, −1, −1, 1], in the reverse direction of the time axis, and the demodulation reference signals in the eighth layer of the resource block are respectively multiplied by the first to the fourth columns of chips in the fourth row of the orthogonal matrix E, [−1, −1, 1, 1], in the reverse direction of the time axis. Here, the multiplication of the demodulation reference signals in respective layers on the second sub-carrier by the first to the fourth columns of chips of the orthogonal matrix E in the reverse direction of the time axis is equivalent to the multiplication of the demodulation reference signals in respective layers on the second sub-carrier by the first to the fourth columns of chips of an orthogonal matrix E' in the positive direction of the time axis. The orthogonal matrix E' equals to an orthogonal matrix obtained by arranging the first to the fourth columns of chips of the orthogonal matrix E reversely.

For the demodulation reference signals in the fifth to the eighth layers of the resource block on the third sub-carrier F3, the same operations as those of the demodulation reference signals in the fifth to the eighth layers of the resource block on the first sub-carrier F1 are repeated.

According to an embodiment of the present disclosure, the following code division multiplexing manner may also be employed.

Here, a second resource block RB2 is taken as an example. For the demodulation reference signals in the fifth to the eighth layers of the resource block on the first sub-carrier F1, the chips in the last two rows of the orthogonal matrix A are shifted cyclically by one column in the positive direction of the time axis to obtain the orthogonal matrix C, and the demodulation reference signals in the fifth to the eighth layers of the resource block on the first sub-carrier F1 are respectively multiplied by the first to the fourth columns of chips of the orthogonal matrix C in the reverse direction of the time axis (the direction of T4→T3→T2→T1).

Specifically, for the first sub-carrier F1, the demodulation reference signals in the fifth layer of the resource block are respectively multiplied by the first to the fourth columns of chips [1, 1, 1, 1] in the first row of the orthogonal matrix C in the reverse direction of the time axis, the demodulation reference signals in the sixth layer of the resource block are respectively multiplied by the first to the fourth columns of chips [1, −1, 1, −1] in the second row of the orthogonal matrix C in the reverse direction of the time axis, the demodulation reference signals in the seventh layer of the resource block are respectively multiplied by the first to the fourth columns of chips [−1, 1, 1, −1] in the third row of the orthogonal matrix C in the reverse direction of the time axis, and the demodulation reference signals in the eighth layer of the resource block are respectively multiplied by the first to the fourth columns of chips [1, 1, −1, −1] in the fourth row of the orthogonal matrix C in the reverse direction of the time axis. Here, the multiplication of the demodulation reference signals in respective layers on the first sub-carrier by the first to the fourth columns of chips of the orthogonal matrix C in the reverse direction of the time axis is equivalent to the multiplication of the demodulation reference signals in respective layers on the first sub-carrier by the first to the fourth columns of chips of an orthogonal matrix C' in the positive direction of the time axis. The orthogonal matrix C' equals to an orthogonal matrix obtained by arranging the first to the fourth columns of chips of the orthogonal matrix C reversely.

For the demodulation reference signals in the fifth to the eighth layers of the resource block on the second sub-carrier F2, the chips in the last two rows of the orthogonal matrix A are shifted cyclically by one column in the positive direction of the time axis to obtain the orthogonal matrix C, and the demodulation reference signals in the fifth to the eighth layers of the resource block on the second sub-carrier F2 are respectively multiplied by the first to the fourth columns of chips of the orthogonal matrix C in the positive direction of the time axis (the direction of T1→T2→T3→T4).

Specifically, for the second sub-carrier F2, the demodulation reference signals in the fifth layer of the resource block are respectively multiplied by the first to the fourth columns of chips [1, 1, 1, 1] in the first row of the orthogonal matrix C in the positive direction of the time axis, the demodulation reference signals in the sixth layer of the resource block are respectively multiplied by the first to the fourth columns of chips [1, −1, 1, −1] in the second row of the orthogonal matrix C in the positive direction of the time axis, the demodulation reference signals in the seventh layer of the resource block are respectively multiplied by the first to the fourth columns of chips [−1, 1, 1, −1] in the third row of the orthogonal matrix C in the positive direction of the time axis, and the demodulation reference signals in the eighth layer of the resource block are respectively multiplied by the first to the fourth columns of chips [1, 1, −1, −1] in the fourth row of the orthogonal matrix C in the positive direction of the time axis.

For the demodulation reference signals in the fifth to the eighth layers of the resource block on the third sub-carrier F3, the same operations as those of the demodulation reference signals in the fifth to the eighth layers of the resource block on the first sub-carrier F1 are repeated.

According to implementation of the present embodiment, a problem of jitter on the time domain of the transmission power of a base station can be effectively eliminated; meanwhile, the mapping method possesses the dual-orthogonality on the time domain and the frequency domain, and the forward compatibility of 3GPP LTE-Advanced Release-9 standard can be kept, and especially the usage efficiency of the power amplifier at the base station side is improved.

According to one embodiment of the present disclosure, the method in the first embodiment may also be used for the demodulation reference signals in the fifth to the eighth layers; meanwhile, the method in the present embodiment may be used for the demodulation reference signals in the first to the fourth layers.

In the present embodiment, there is correspondence between the orthogonal matrices used for mapping on each sub-carrier and the orthogonal matrices in the first embodiment. For example, in the first embodiment, the orthogonal matrix used on the sub-carrier F1 of the RB1 is the orthogonal matrix C obtained by cyclically shifting the chips in the last two rows of the orthogonal matrix A by one column in the positive direction of the time axis; and in the second embodiment, the orthogonal matrix used on the sub-carrier F1 of the RB1 (adjacent to the sub-carrier F1 of the first embodiment) is the orthogonal matrix E obtained by cyclically shifting the chips in the last two rows of the orthogonal matrix A by one column in the reverse direction of the time axis. In the subsequent sub-carriers, such relationship is followed.

(Third Embodiment)

Figure 19:
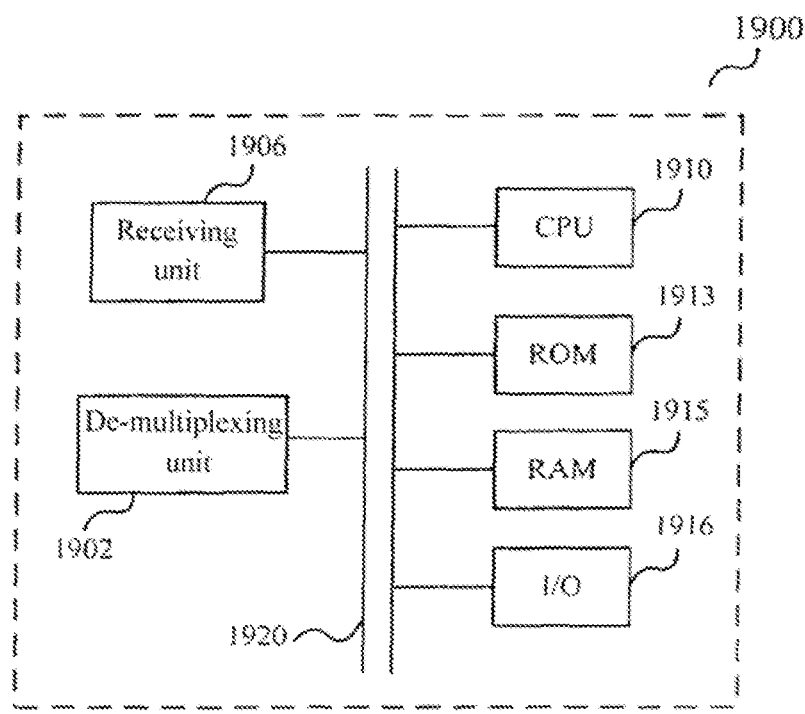
FIG. 19 is a block diagram showing a de-multiplexing device of a wireless communication system according to an embodiment of the present disclosure.

FIG. 19 is a block diagram showing a de-multiplexing device of a wireless communication system according to an embodiment of the present disclosure.

As shown in FIG. 19, a de-multiplexing device 1900 according to the present disclosure includes a de-multiplexing unit 1902 and a receiving unit 1906 connected with each other.

The de-multiplexing device 1900 according to the present disclosure may also include: a Central Processing Unit (CPU) 1910 for executing related programs to process various data and to control operations of respective units in the device 1900; a Read Only Memory (ROM) 1913 for storing various programs required for the CPU 1910 to perform various process and control; a Random Access Memory (RAM) 1915 for storing intermediate data temporarily produced by the CPU 1910 in the procedure of process and control; a Input/Output (I/O) unit 1916 for connecting with external devices, transporting various data between the external devices and the de-multiplexing device 1900 and so on. The above de-multiplexing unit 1902, receiving unit 1906, CPU 1910, ROM 1913, RAM 1915, I/O unit 1916, etc. may be connected via a data and/or command bus 1920, and they transfer signals between one another.

The respective units as described above do not limit the scope of the present disclosure. According to an embodiment of the present disclosure, the function of either of the de-multiplexing unit 1902 and the receiving unit 1906 may also be realized by functional software in combination with the above CPU 1910, ROM 1913, RAM 1915, I/O unit 1916 and the like. And, the functions of the de-multiplexing unit 1902 and the receiving unit 1906 may also be realized by combining them into one unit.

The de-multiplexing device 1900 of the present disclosure uses an orthogonal matrix to perform de-multiplexing of the code division multiplexing signals in multiple layers of the resource block. In the de-multiplexing device 1900, the receiving unit 1906 receives the code division multiplexing signals in the multiple layers of the resource block. The de-multiplexing unit 1902 multiplies the chips in respective rows of the orthogonal matrix correspondingly by the code division multiplexing signals in the corresponding layers of the resource block to obtain the demodulation reference signals. According to the present embodiment, the orthogonal matrix may be an orthogonal matrix obtained by changing the order of chips in particular rows of another orthogonal matrix. In the matrix obtained by changing the order of chips in a part of rows, the original orthogonal properties between the respective rows and between the respective columns of the original orthogonal matrix are kept simultaneously.

According to an embodiment of the present disclosure, in the above orthogonal matrix, it may change the order of chips by cyclically shifting the chips in a part of rows of another orthogonal matrix in the positive or reverse direction of the time axis, or by multiplying a part of rows of another orthogonal matrix by nonzero numbers and cyclically shifting the chips in the respective rows in the positive or reverse direction of the time axis. The de-multiplexing unit 1902 may multiply the code division multiplexing signals on the adjacent sub-carriers in the respective layers of the resource block by the chips in the first column to the last column of the orthogonal matrix with the order of chips changed alternately reverse in the time direction.

Specifically, for example, the first sub-carrier F1 of the first resource block RB1 shown in FIG. 15 is taken as an example. When the receiving unit 1906 receives the demodulation reference signals such as S1, S2, S3, S4 on the first sub-carrier F1 of the first resource block RB1, which are coded and multiplexed by using the manner of the first embodiment or the second embodiment of the present disclosure, the de-multiplexing unit 1902 multiplies the received code division multiplexing signals S1, S2, S3, S4 by the corresponding rows of the orthogonal matrix C after the cyclic shift, thereby the original demodulation reference signals in the respective layers of the resource block can be obtained.

According to implementation of the present embodiment, a problem of jitter on the time domain of the transmission power of a base station can be effectively eliminated; meanwhile, the mapping method possesses the dual-orthogonality on the time domain and the frequency domain, and the forward compatibility of 3GPP LTE-Advanced Release-9 standard can be kept, and especially the usage efficiency of the power amplifier at the base station side is improved.

(Fourth Embodiment)

Figure 20:
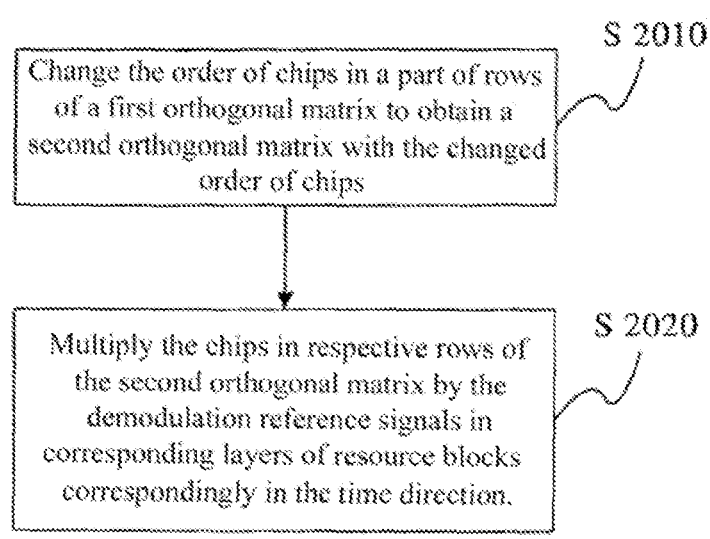
FIG. 20 is a flowchart of a code division multiplexing method based on the orthogonal codes according to the present embodiment.

FIG. 20 is a flowchart of the code division multiplexing method based on the orthogonal codes according to the present embodiment.

The orthogonal codes based code division multiplexing method according to the present embodiment performs the code division multiplexing of the demodulation reference signals in multiple layers of a resource block by using an orthogonal matrix. As shown in FIG. 20, at step S2010, the order of chips in a part of rows of a first orthogonal matrix is changed to obtain a second orthogonal matrix with the changed order of chips. At step S2020, the chips in the respective rows of the second orthogonal matrix are multiplied by the demodulation reference signals in the corresponding layers of the resource block in the time direction, so as to obtain code division multiplexing signals.

According to the present embodiment, the step S2010 may be implemented by the processing unit 1002 as shown in FIG. 10, and the step S2020 may be implemented by the multiplexing unit 1006.

The orthogonal codes based code division multiplexing method according to the present embodiment may also include a step of changing the order of chips by cyclically shifting the chips in a part of rows of the first orthogonal matrix in the positive or reverse direction of the time axis, or by multiplying a part of rows of the first orthogonal matrix by nonzero numbers and cyclically shifting the chips in the respective rows in the positive or reverse direction of the time axis, and multiplying the demodulation reference signals on the adjacent sub-carriers in the respective layers of the resource block by the chips in the first column to the last column of the second orthogonal matrix alternately reverse in the time direction.

For an orthogonal matrix of 4×4 orders and the four layers of a resource block, the orthogonal codes based code division multiplexing method according to the present embodiment may also include a step of changing the order of chips by cyclically shifting the chips in the last two rows of the first orthogonal matrix by one column in the positive direction of the time, and multiplying the demodulation reference signals on the first sub-carrier in the first to the fourth layers of the resource block respectively by the chips in the first column to the fourth column of the second orthogonal matrix in the positive direction of the time.

For the orthogonal matrix of 4×4 orders and the four layers of the resource block, the orthogonal codes based code division multiplexing method according to the present embodiment may also include a step of changing the order of chips by cyclically shifting the chips in the last two rows of the first orthogonal matrix by one column in the positive direction of the time, and multiplying the demodulation reference signals on the second sub-carrier in the first to the fourth layers of the resource block respectively by the chips in the first column to the fourth column of the second orthogonal matrix in the reverse direction of the time.

For the orthogonal matrix of 4×4 orders and the four layers of the resource block, the orthogonal codes based code division multiplexing method according to the present embodiment may also include a step of changing the order of chips by cyclically shifting the chips in the last two rows of the first orthogonal matrix by one column in the reverse direction of the time, and multiplying the demodulation reference signals on the first sub-carrier in the first to the fourth layers of the resource block respectively by the chips in the first column to the fourth column of the second orthogonal matrix in the reverse direction of the time.

For the orthogonal matrix of 4×4 orders and the four layers of the resource block, the orthogonal codes based code division multiplexing method according to the present embodiment may also include a step of changing the order of chips by cyclically shifting the chips in the last two rows of the first orthogonal matrix by one column in the reverse direction of the time, and multiplying the demodulation reference signals on the second sub-carrier in the first to the fourth layers of the resource block respectively by the chips in the first column to the fourth column of the second orthogonal matrix in the positive direction of the time.

For the orthogonal matrix of 4×4 orders and the four layers of the resource block, the orthogonal codes based code division multiplexing method according to the present embodiment may also include following steps of: changing the order of chips by multiplying a part of rows of the first orthogonal matrix by nonzero numbers and cyclically shifting the chips in the respective rows by one column in the positive direction of the time, and multiplying the demodulation reference signals on the first sub-carrier in the first to the fourth layers of the resource block respectively by the chips in the first column to the fourth column of the second orthogonal matrix in the positive direction of the time, and multiplying the demodulation reference signals on the second sub-carrier in the first to the fourth layers of the resource block respectively by the chips in the first column to the fourth column of the second orthogonal matrix in the reverse direction of the time; and changing the order of chips by multiplying a part of rows of the first orthogonal matrix by nonzero numbers and cyclically shifting the chips in the respective rows by one column in the reverse direction of the time, and multiplying the demodulation reference signals on the third sub-carrier in the first to the fourth layers of the resource block respectively by the chips in the first column to the fourth column of the second orthogonal matrix in the positive direction of the time, and multiplying the demodulation reference signals on the fourth sub-carrier in the first to the fourth layers of the resource block respectively by the chips in the first column to the fourth column of the second orthogonal matrix in the reverse direction of the time.

For the orthogonal matrix of 4×4 orders and the fifth to the eighth layers of the eight layers of the resource block, the orthogonal codes based code division multiplexing method according to the present embodiment may also include a step of performing the same processing manner for the demodulation reference signals in the fifth to the eighth of the resource block as the demodulation reference signals in the first to the fourth layers of the resource block.

For the orthogonal matrix of 4×4 orders and the fifth to the eighth layers of the eight layers of the resource block, the orthogonal codes based code division multiplexing method according to the present embodiment may also include a step of changing the order of chips by cyclically shifting the chips in the last two rows of the first orthogonal matrix by one column in the reverse direction of the time, and multiplying the demodulation reference signals on the first sub-carrier in the fifth to the eighth layers of the resource block respectively by the chips in the first column to the fourth column of the second orthogonal matrix in the positive direction of the time.

For the orthogonal matrix of 4×4 orders and the fifth to the eighth layers of the eight layers of the resource block, the orthogonal codes based code division multiplexing method according to the present embodiment may also include a step of changing the order of chips by cyclically shifting the chips in the last two rows of the first orthogonal matrix by one column in the reverse direction of the time, and multiplying the demodulation reference signals on the second sub-carrier in the fifth to the eighth layers of the resource block respectively by the chips in the first column to the fourth column of the second orthogonal matrix in the reverse direction of the time.

For the orthogonal matrix of 4×4 orders and the fifth to the eighth layers of the eight layers of the resource block, the orthogonal codes based code division multiplexing method according to the present embodiment may also include a step of changing the order of chips by cyclically shifting the chips in the last two rows of the first orthogonal matrix by one column in the positive direction of the time, and multiplying the demodulation reference signals on the first sub-carrier in the fifth to the eighth layers of the resource block respectively by the chips in the first column to the fourth column of the second orthogonal matrix in the reverse direction of the time.

For the orthogonal matrix of 4×4 orders and the fifth to the eighth layers of the eight layers of the resource block, the orthogonal codes based code division multiplexing method according to the present embodiment may also include a step of changing the order of chips by cyclically shifting the chips in the last two rows of the first orthogonal matrix by one column in the positive direction of the time, and multiplying the demodulation reference signals on the second sub-carrier in the fifth to the eighth layers of the resource block respectively by the chips in the first column to the fourth column of the second orthogonal matrix in the positive direction of the time.

The order of executing respective steps of the above method does not limit the scope of the present disclosure, and the above respective steps can be executed in parallel or in a different order.

The above respective steps may be implemented respectively or collectively by the processing unit 1002 and the multiplexing unit 1006 of the code division multiplexing device 1000.

According to the implementation of the present embodiment, a problem of the jitter on the time domain of the transmission power of a base station can be effectively eliminated; meanwhile, the mapping method possesses the dual-orthogonality on the time domain and the frequency domain, and the forward compatibility of 3GPP LTE-Advanced Release-9 standard can be kept, and especially the usage efficiency of the power amplifier at the base station side is improved.

(Fifth Embodiment)

FIG. 21 is a flowchart showing a de-multiplexing method according to the present embodiment.

The de-multiplexing method according to the present embodiment demultiplexes the code division multiplexing signals in the multiple layers of resource block by using an orthogonal matrix. As shown in FIG. 21, in the step S2110, the code division multiplexing signals in the multiple layers of the resource blocks are received. In the step S2120, the chips in respective rows of the orthogonal matrix are multiplied correspondingly by the code division multiplexing signals in the corresponding layers of the resource block in the time direction to obtain the demodulation reference signals. In the method according to the present disclosure, the orthogonal matrix is obtained by changing the order of chips in particular rows of another orthogonal matrix.

In the de-multiplexing method according to the present disclosure, for the orthogonal matrix, the order of chips is changed by cyclically shifting the chips in a part of rows of another orthogonal matrix in the positive or reverse direction of the time or by multiplying a part of rows of another orthogonal matrix by nonzero numbers and cyclically shifting the chips in the nonzero rows in the positive or reverse direction of the time, and the de-multiplexing method further includes: multiplying the code division multiplexing signals on the adjacent sub-carriers in the respective layers of the resource block by the chips in the first column to the last column of the orthogonal matrix alternately reverse in the time direction.

The above step S2110 may be implemented by the receiving unit 1906 of the de-multiplexing device 1900, and the step S2120 may be implemented by the de-multiplexing unit 1902.

The order of executing respective steps of the above method does not limit the scope of the present disclosure, and the above respective steps can be executed in parallel or in a different order.

According to the implementation of the present embodiment, a problem of the jitter on the time domain of the transmission power of a base station can be effectively eliminated; meanwhile, the mapping method possesses the dual-orthogonality on the time domain and the frequency domain, and the forward compatibility of 3GPP LTE-Advanced Release-9 standard can be kept, and especially the usage efficiency of the power amplifier at the base station side is improved.

(Sixth Embodiment)

The orthogonal matrices in the foregoing embodiments all take Walsh matrices as examples; however, in fact, the methods according to the present disclosure are applicable to general orthogonal matrices. In this embodiment, an example of other type of an orthogonal matrix is given, and a corresponding mapping scheme for the orthogonal codes is constructed by using the same method as the first embodiment.

FIG. 22 shows an example of a four-dimensional discrete Fourier transform matrix.

In FIG. 22, an orthogonal matrix A2 is obtained through the same permuting as FIG. 13. Of course, the orthogonal matrix A2 may also be obtained by the same method as that shown in FIG. 12. Firstly, the chips in one row (for example, the chips in the second row [1, −1, 1, −1]) of the orthogonal matrix A (the first orthogonal matrix) are multiplied by (−1) to obtain the matrix A1 which is an orthogonal matrix. The columns of the orthogonal matrix A1 are cyclically shifted by one bit to the left (in the reverse direction of the time axis), and the matrix A2 is obtained. Then, on the basis of the A2, the method of the first embodiment is repeated, and an orthogonal code mapping scheme on the complex domain can be obtained.

Figure 23:
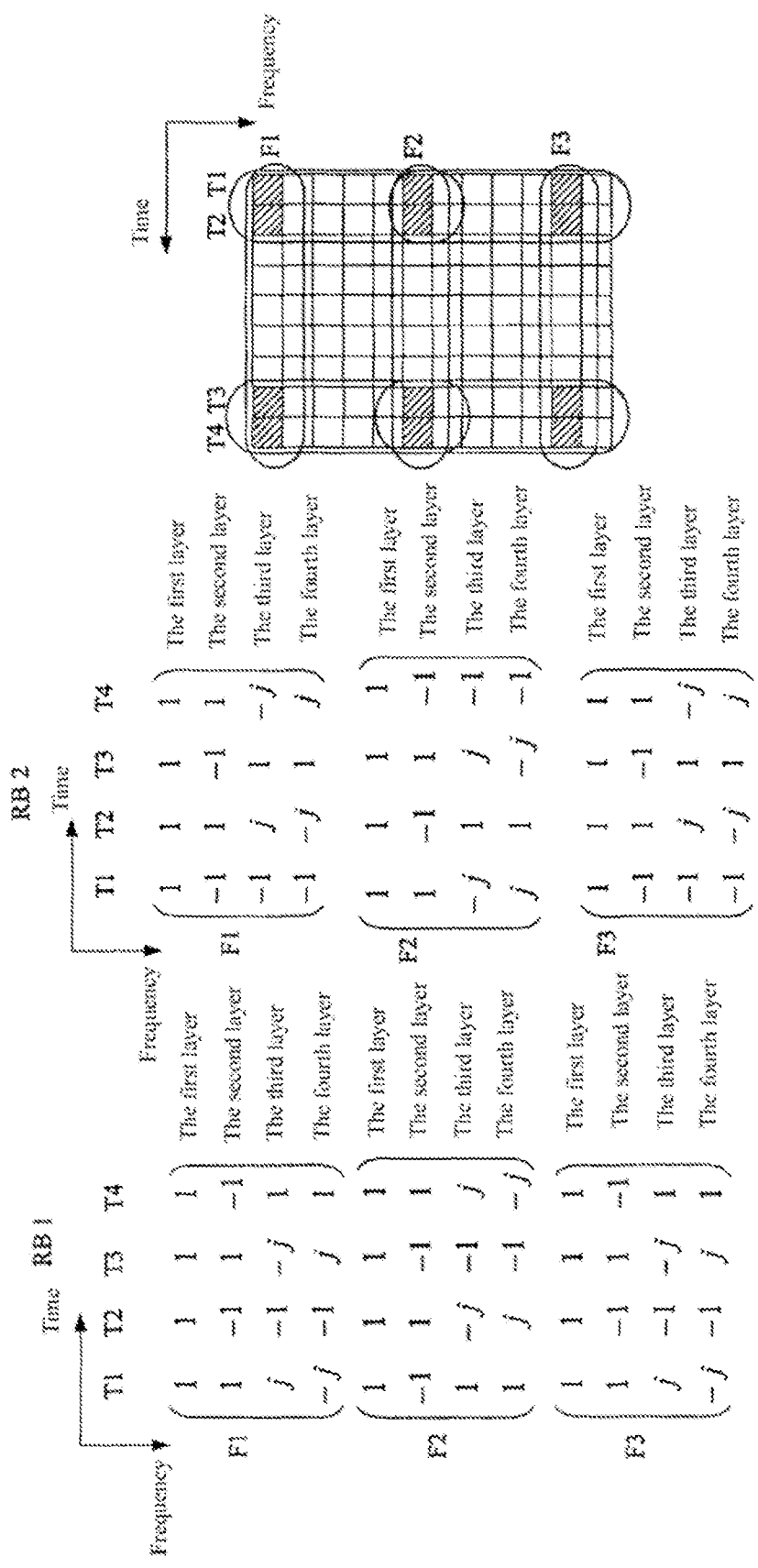
FIG. 23 shows a diagram of an orthogonal codes mapping scheme on the complex domain obtained by repeating the method of the first embodiment on the basis of the orthogonal matrix A2 obtained in FIG. 22.

FIG. 23 shows a diagram of an orthogonal code mapping scheme on the complex domain obtained by repeating the method of the first embodiment on the basis of the orthogonal matrix A2 obtained in FIG. 22.

Here, the first resource block RB1 is taken as an example. The method may be that the demodulation reference signals in the first to the fourth layers of the resource block on the first sub-carrier F1 are respectively multiplied by the first to the fourth columns of chips of the orthogonal matrix A2 in the positive direction of the time axis (the direction of T1→T2→T3→T4).

Specifically, for the first sub-carrier F1, the demodulation reference signals in the first layer of the resource block are respectively multiplied by the first to the fourth columns of chips [1, 1, 1, 1] in the first row of the orthogonal matrix A2 in the positive direction of the time axis, the demodulation reference signals in the second layer of the resource block are respectively multiplied by the first to the fourth columns of chips [1, −1, 1, −1] in the second row of the orthogonal matrix A2 in the positive direction of the time axis, the demodulation reference signals in the third layer of the resource block are respectively multiplied by the first to the fourth columns of chips [j, −1, −j, 1] in the third row of the orthogonal matrix A2 in the positive direction of the time axis, and the demodulation reference signals in the fourth layer of the resource block are respectively multiplied by the first to the fourth columns of chips [−j, −1, j, 1] in the fourth row of the orthogonal matrix A2 in the positive direction of the time axis.

The method may also be that the demodulation reference signals in the first to the fourth layers of the resource block on the second sub-carrier F2 are respectively multiplied by the first to the fourth columns of chips of the orthogonal matrix A2 in the reverse direction of the time axis (the direction of T4→T3→T2→T1).

Specifically, for the second sub-carrier F2, the demodulation reference signals in the first layer of the resource block are respectively multiplied by the first to the fourth columns of chips [1, 1, 1, 1] in the first row of the orthogonal matrix A2 in the reverse direction of the time axis, the demodulation reference signals in the second layer of the resource block are respectively multiplied by the first to the fourth columns of chips [1, −1, 1, −1] in the second row of the orthogonal matrix A2 in the reverse direction of the time axis, the demodulation reference signals in the third layer of the resource block are respectively multiplied by the first to the fourth columns of chips [j, −1, −j, 1] in the third row of the orthogonal matrix A2 in the reverse direction of the time axis, and the demodulation reference signals in the fourth layer of the resource block are respectively multiplied by the first to the fourth columns of chips [−j, −1, j, 1] in the fourth row of the orthogonal matrix A2 in the reverse direction of the time axis. Here, the multiplication of the demodulation reference signals in respective layers on the second sub-carrier respectively by the first to the fourth columns of chips of the orthogonal matrix A2 in the reverse direction of the time axis is equivalent to the multiplication of the demodulation reference signals in respective layers on the second sub-carrier respectively by the first to the fourth columns of chips of an orthogonal matrix A2' in the positive direction of the time axis. The orthogonal matrix A2' equals to an orthogonal matrix obtained by arranging the first to the fourth columns of chips of the orthogonal matrix A2 reversely.

For the demodulation reference signals in the first to the fourth layers of the resource block on the third sub-carrier F3, the same operations as those of the demodulation reference signals in the first to the fourth layers of the resource block on the first sub-carrier F1 are repeated.

In addition, the chips in one row (for example, the chips in the second row [1, −1, 1, −1]) of the orthogonal matrix A (the first orthogonal matrix) are multiplied by (−1) to obtain the matrix A1, and the columns of the orthogonal matrix A1 are cyclically shifted by one bit to the right (in the positive direction of the time axis) to obtain another matrix $$A3 \begin{bmatrix} 1 & 1 & 1 & 1 \\ 1 & -1 & 1 & -1 \\ -j & 1 & j & -1 \\ j & 1 & -j & -1 \end{bmatrix}$$

(the second orthogonal matrix). Then, on the basis of the A3, the method of the first embodiment is repeated, and an orthogonal code mapping scheme on the complex domain can be obtained.

Here, the second resource block RB2 is taken as an example. The method may be that the demodulation reference signals in the first to the fourth layers of the resource block on the first sub-carrier F1 are respectively multiplied by the first to the fourth columns of chips of the orthogonal matrix A3 in the reverse direction of the time axis (the direction of T4→T3→T2→T1).

Specifically, for the first sub-carrier F1, the demodulation reference signals in the first layer of the resource block are respectively multiplied by the first to the fourth columns of chips [1, 1, 1, 1] in the first row of the orthogonal matrix A3 in the reverse direction of the time axis, the demodulation reference signals in the second layer of the resource block are respectively multiplied by the first to the fourth columns of chips [1, −1, 1, −1] in the second row of the orthogonal matrix A3 in the reverse direction of the time axis, the demodulation reference signals in the third layer of the resource block are respectively multiplied by the first to the fourth columns of chips [−j, 1, j, −1] in the third row of the orthogonal matrix A3 in the reverse direction of the time axis, and the demodulation reference signals in the fourth layer of the resource block are respectively multiplied by the first to the fourth columns of chips [j, 1, −j, -1] in the fourth row of the orthogonal matrix A3 in the reverse direction of the time axis. Here, the multiplication of the demodulation reference signals in respective layers on the first sub-carrier respectively by the first to the fourth columns of chips of the orthogonal matrix A3 in the reverse direction of the time axis is equivalent to the multiplication of the demodulation reference signals in respective layers on the first sub-carrier respectively by the first to the fourth columns of chips of an orthogonal matrix A3' in the positive direction of the time axis. The orthogonal matrix A3' equals to an orthogonal matrix obtained by arranging the first to the fourth columns of chips of the orthogonal matrix A3 reversely.

The method may also be that the demodulation reference signals in the first to the fourth layers of the resource block on the second sub-carrier F2 are respectively multiplied by the first to the fourth columns of chips of the orthogonal matrix A3 in the positive direction of the time axis (the direction of T1→T2→T3→T4).

Specifically, for the second sub-carrier F2, the demodulation reference signals in the first layer of the resource block are respectively multiplied by the first to the fourth columns of chips [1, 1, 1, 1] in the first row of the orthogonal matrix A3 in the positive direction of the time axis, the demodulation reference signals in the second layer of the resource block are respectively multiplied by the first to the fourth columns of chips [1, −1, 1, −1] in the second row of the orthogonal matrix A3 in the positive direction of the time axis, the demodulation reference signals in the third layer of the resource block are respectively multiplied by the first to the fourth columns of chips [−j, 1, j, −1] in the third row of the orthogonal matrix A3 in the positive direction of the time axis, and the demodulation reference signals in the fourth layer of the resource block are respectively multiplied by the first to the fourth columns of chips [j, 1, −j, -1] in the fourth row of the orthogonal matrix A3 in the positive direction of the time axis.

For the demodulation reference signals in the first to the fourth layers of the resource block on the third sub-carrier F3, the same operations as those of the demodulation reference signals in the first to the fourth layers of the resource block on the first sub-carrier F1 are repeated.

According to the implementation of the present embodiment, a problem of the jitter on the time domain of the transmission power of a base station can be effectively eliminated; meanwhile, the mapping method possesses the dual-orthogonality on the time domain and the frequency domain, and the forward compatibility of 3GPP LTE-Advanced Release-9 standard can be kept, and especially the usage efficiency of the power amplifier at the base station side is improved.

(Seventh Embodiment)

Figure 24:
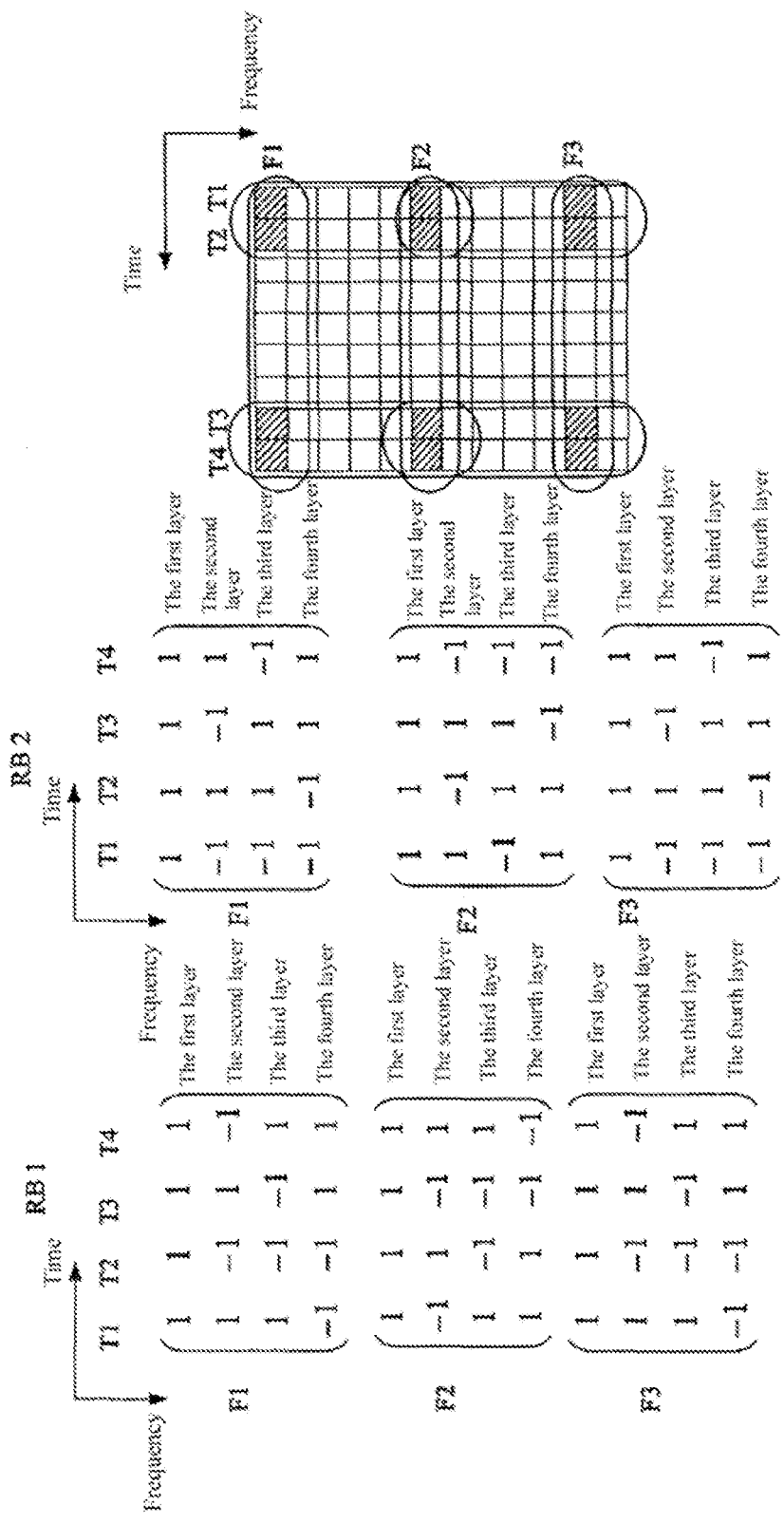
FIG. 24 shows a diagram according to a seventh embodiment of the present disclosure.

FIG. 24 shows a diagram according to the seventh embodiment of the present disclosure.

The seventh embodiment is one embodiment which is completely equivalent to the first embodiment. As shown in FIG. 24, another embodiment completely symmetrical with the first embodiment is obtained by adjusting the locations of respective matrices in FIG. 15, for example, replacing the matrices corresponding to the first sub-carrier F1 and the third sub-carrier F3 of the first resource block RB1 by the matrix corresponding to the second sub-carrier F2 of the second resource block RB2, replacing the matrix corresponding to the second sub-carrier F2 of the first resource block RB1 by the matrix corresponding to the first sub-carrier F1 of the second resource block RB2, meanwhile replacing the matrices corresponding to the first sub-carrier F1 and the third sub-carrier F3 of the second resource block RB2 by the matrix corresponding to the second sub-carrier F2 of the first resource block RB1, and replacing the matrix corresponding to the second sub-carrier F2 of the second resource block RB2 by the matrix corresponding to the first sub-carrier F1 of the first resource block RB1. For the demodulation reference signals in the first to the fourth layers of the resource block on the respective sub-carriers, the same operations as those of the first embodiment are repeated, so the same effect as the first embodiment may be obtained. Specific details are no more described herein.

(Eighth Embodiment)

The respective embodiments as described above are all designed with respect to normal sub-frame structures in a LTE-A system. In the LTE-A system, there is a kind of special sub-frame structure, that is, the sub-frames with extended cyclic prefixes.

Figure 25:
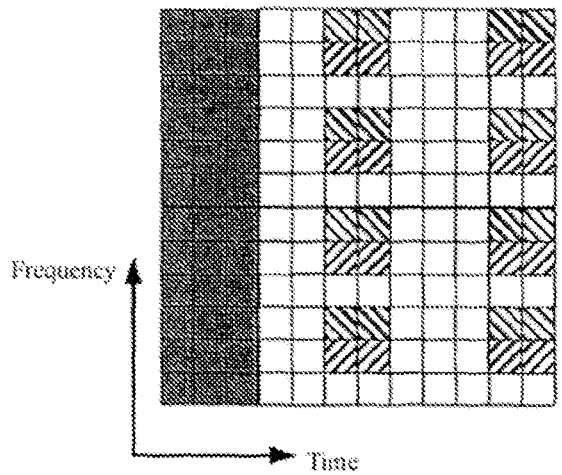
FIG. 25 is a diagram showing a sub-frame with an extended cyclic prefix.

FIG. 25 is a diagram showing a sub-frame with an extended cyclic prefix.

Figure 3:
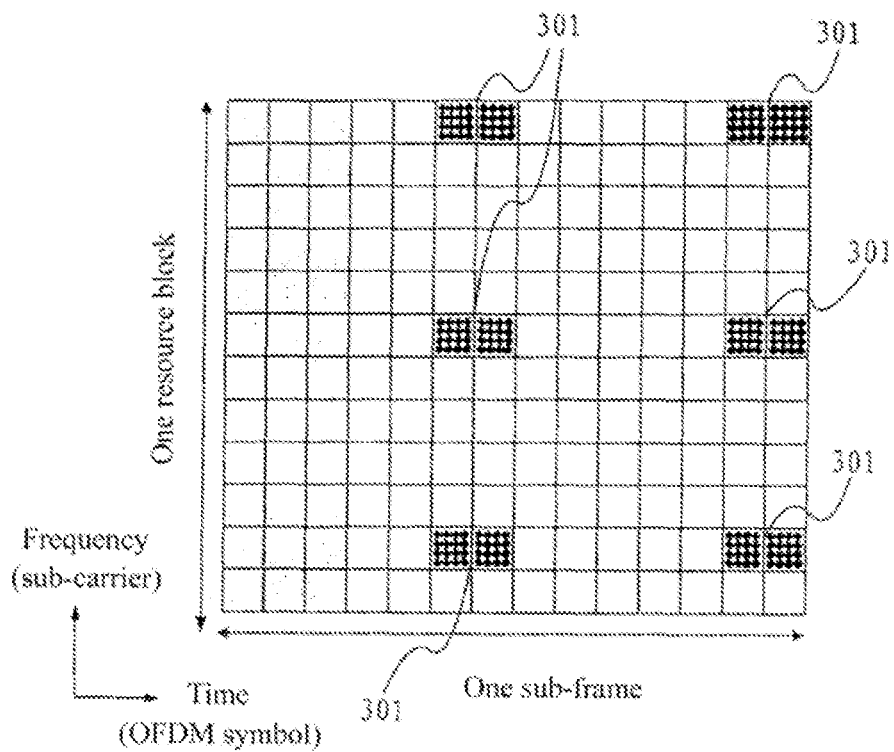
FIG. 3 is a diagram showing an example of a resource block constituting a data stream transmitted to a mobile terminal from a base station in a wireless communication system.
Figure 4:
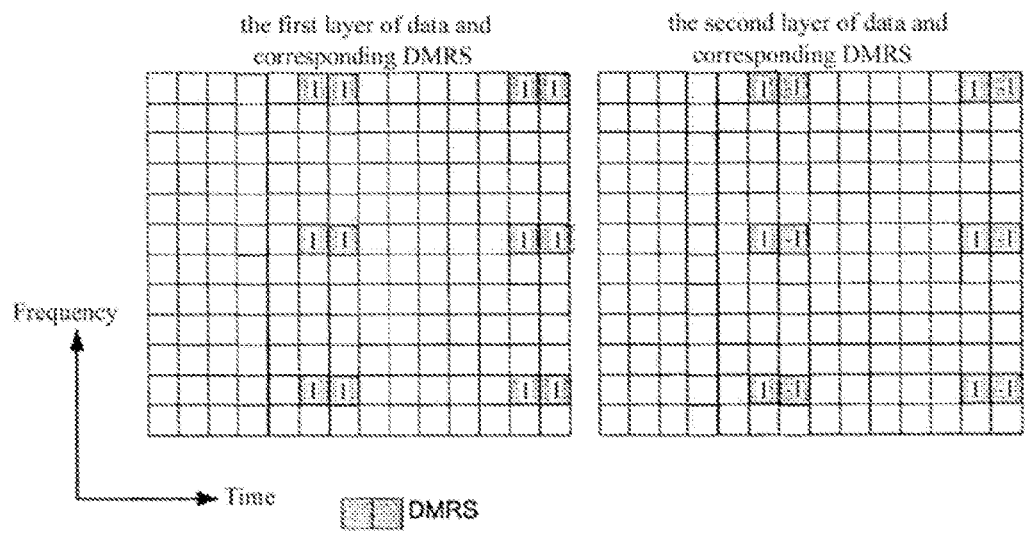
FIG. 4 shows an example that the different layers of demodulation reference signals are multiplexed by using an orthogonal matrix.
Figure 5:
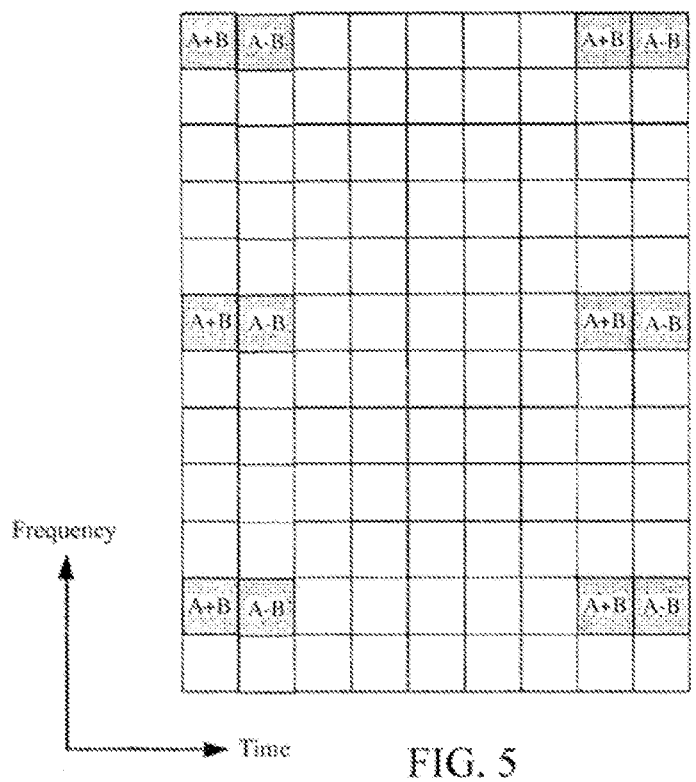
FIG. 5 shows a sectional diagram of a resource block after two layers of demodulation reference signals are multiplexed by using Walsh codes with the code length of 2 such as [1, 1] and [1, −1]
Figure 6:
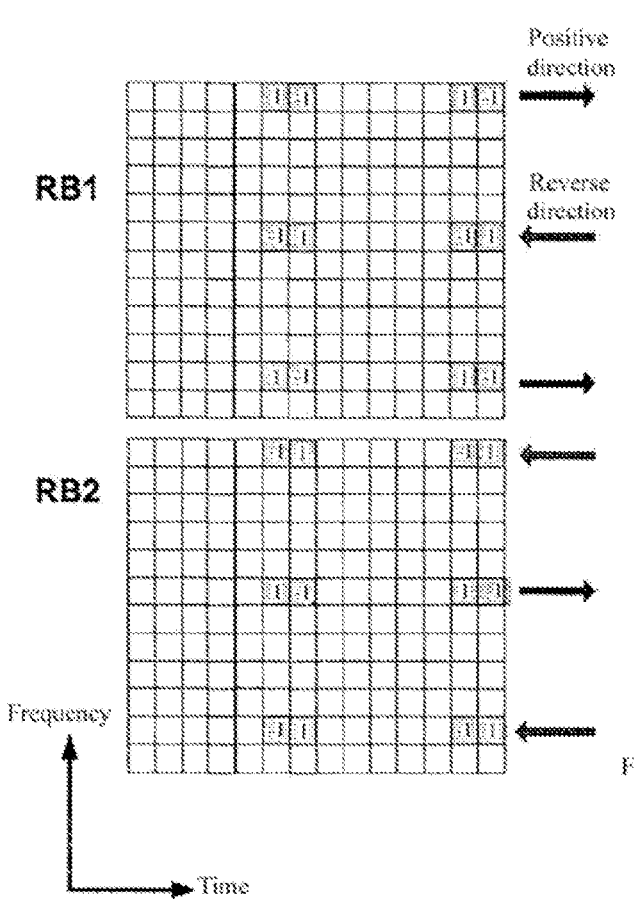
FIG. 6 shows an actual mapping manner of the code division multiplexing based on the orthogonal codes in the LTE-A Release-9.
Figure 7:
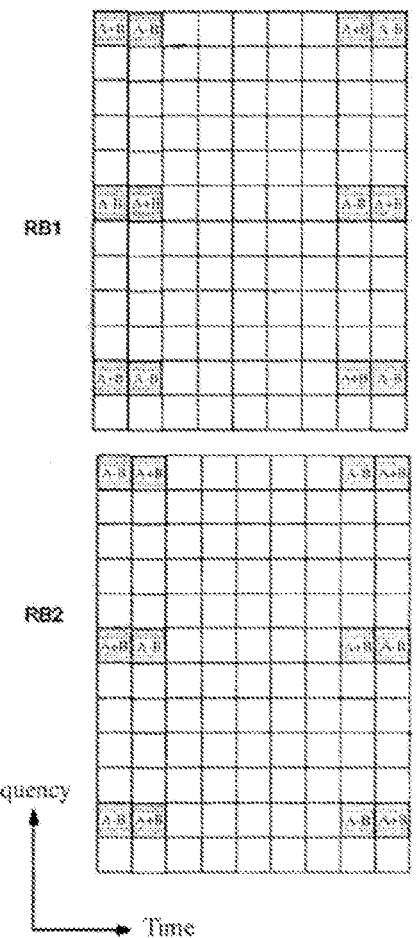
FIG. 7 shows a sectional diagram of resource blocks after the two layers of demodulation reference signals are multiplexed by using Walsh codes with the code length of 2 such as [1, 1] and [1, −1] in the LTE-A Release-9.

The main difference between the sub-frame shown in FIG. 25 and the sub-frame structure shown in FIG. 3 is in that a resource block RB has only 12 OFDM symbols in the sub-frame with the extended cyclic prefix, while a resource block RB contains 14 OFDM symbols in the sub-frame structure shown in FIG. 3. The possible positions of the demodulation reference signals (DMRSs) in the sub-frame with the extended cyclic prefix are given in FIG. 25. Different from FIG. 8, one OFDM symbol contains 4 DMRSs in FIG. 25, while one OFDM symbol contains only 3 DMRSs in FIG. 8.

The densities of the demodulation reference signals on the frequency domain are different (changed from 3 to 4), which decides that the mappings of the orthogonal codes multiplexing DMRSs are also different. In fact, by using the matrix C and the matrix E shown FIG. 12, the orthogonal code mapping scheme of the demodulation reference signals as shown in FIG. 25 may be obtained likewise.

Figure 26:
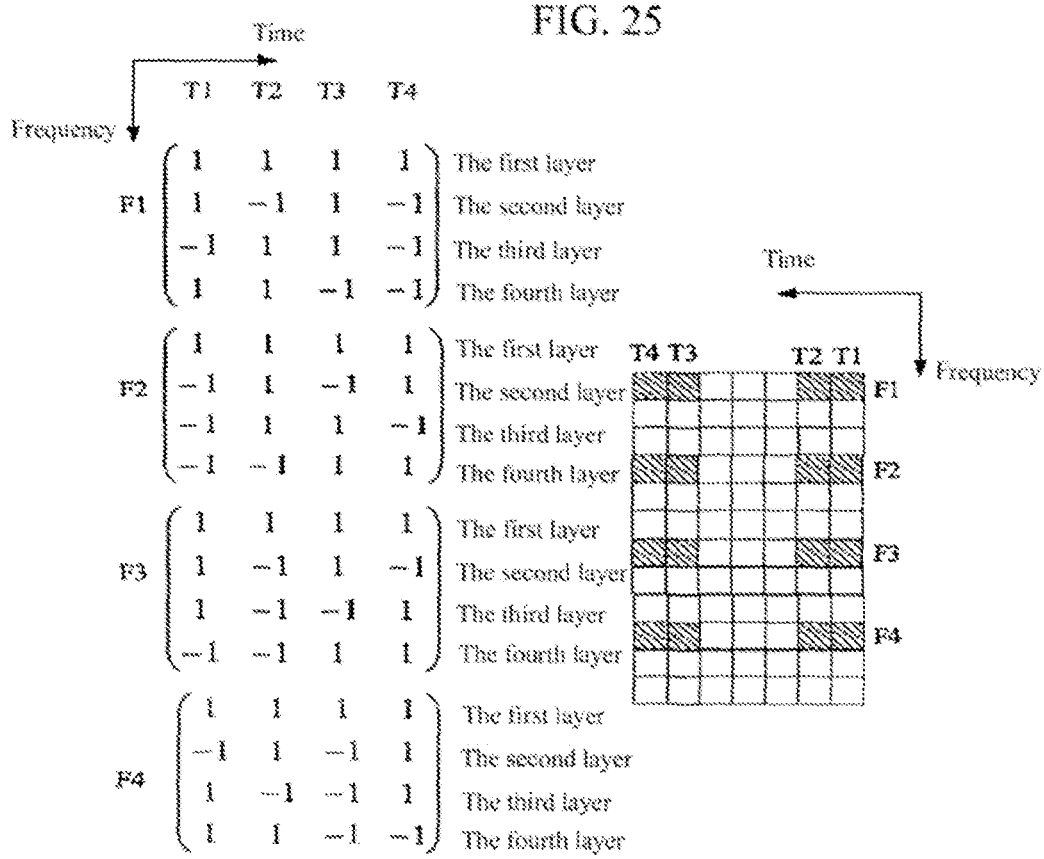
FIG. 26 shows an orthogonal codes mapping scheme of the demodulation reference signals as shown in FIG. 25.

FIG. 26 shows an orthogonal code mapping scheme of the demodulation reference signals as shown in FIG. 25.

As shown in FIG. 26, for the demodulation reference signals in the first to the fourth layers of the resource block on the first sub-carrier F1, the chips in the last two rows of the orthogonal matrix A are cyclically shifted by one column in the positive direction of the time axis to obtain the orthogonal matrix C (as shown in FIG. 12), and the demodulation reference signals in the first to the fourth layers of the resource block on the first sub-carrier F1 are respectively multiplied by the first column to the fourth column of chips of the orthogonal matrix C in the positive direction of the time axis (the direction of T1→T2→T3→T4).

Specifically, for the first sub-carrier F1, the demodulation reference signals in the first layer of the resource block are respectively multiplied by the first to the fourth columns of chips [1, 1, 1, 1] in the first row of the orthogonal matrix C in the positive direction of the time axis, the demodulation reference signals in the second layer of the resource block are respectively multiplied by the first to the fourth columns of chips [1, −1, 1, −1] in the second row of the orthogonal matrix C in the positive direction of the time axis, the demodulation reference signals in the third layer of the resource block are respectively multiplied by the first to the fourth columns of chips [−1, 1, 1, −1] in the third row of the orthogonal matrix C in the positive direction of the time axis, and the demodulation reference signals in the fourth layer of the resource block are respectively multiplied by the first to the fourth columns of chips [1, 1, −1, −1] in the fourth row of the orthogonal matrix C in the positive direction of the time axis.

For the demodulation reference signals in the first to the fourth layers of the resource block on the second sub-carrier F2, the chips in the last two rows of the orthogonal matrix A are cyclically shifted by one column in the positive direction of the time axis to obtain the orthogonal matrix C (as shown in FIG. 12), and the demodulation reference signals in the first to the fourth layers of the resource block on the second sub-carrier F2 are respectively multiplied by the first column to the fourth column of chips of the orthogonal matrix C in the reverse direction of the time axis (the direction of T4→T3→T2→T1).

Specifically, for the second sub-carrier F2, the demodulation reference signals in the first layer of the resource block are respectively multiplied by the first to the fourth columns of chips [1, 1, 1, 1] in the first row of the orthogonal matrix C in the reverse direction of the time axis, the demodulation reference signals in the second layer of the resource block are respectively multiplied by the first to the fourth columns of chips [1, −1, 1, −1] in the second row of the orthogonal matrix C in the reverse direction of the time axis, the demodulation reference signals in the third layer of the resource block are respectively multiplied by the first to the fourth columns of chips [−1, 1, 1, −1] in the third row of the orthogonal matrix C in the reverse direction of the time axis, and the demodulation reference signals in the fourth layer of the resource block are respectively multiplied by the first to the fourth columns of chips [1, 1, −1, −1] in the fourth row of the orthogonal matrix C in the reverse direction of the time axis.

For the demodulation reference signals in the first to the fourth layers of the resource block of the third sub-carrier F3, the chips in the last two rows of the orthogonal matrix A are cyclically shifted by one column in the reverse direction of the time axis to obtain the orthogonal matrix E (as shown in FIG. 12), and the demodulation reference signals in the first to the fourth layers of the resource block on the third sub-carrier F3 are respectively multiplied by the first column to the fourth column of chips of the orthogonal matrix E in the positive direction of the time axis (the direction of T1→T2→T3→T4).

Specifically, for the third sub-carrier F3, the demodulation reference signals in the first layer of the resource block are respectively multiplied by the first to the fourth columns of chips [1, 1, 1, 1] in the first row of the orthogonal matrix E in the positive direction of the time axis, the demodulation reference signals in the second layer of the resource block are respectively multiplied by the first to the fourth columns of chips [1, −1, 1, −1] in the second row of the orthogonal matrix E in the positive direction of the time axis, the demodulation reference signals in the third layer of the resource block are respectively multiplied by the first to the fourth columns of chips [1, −1, −1, 1] in the third row of the orthogonal matrix E in the positive direction of the time axis, and the demodulation reference signals in the fourth layer of the resource block are respectively multiplied by the first to the fourth columns of chips [−1, −1, 1, 1] in the fourth row of the orthogonal matrix E in the positive direction of the time axis.

For the demodulation reference signals in the first to fourth layers of the resource block on the fourth sub-carrier F4, the chips in the last two rows of the orthogonal matrix A are cyclically shifted by one column in the reverse direction of the time axis to obtain the orthogonal matrix E (as shown in FIG. 12), and the demodulation reference signals in the first to the fourth layers of the resource block on the fourth sub-carrier F4 are respectively multiplied by the first column to the fourth column of chips of the orthogonal matrix E in the reverse direction of the time axis (the direction of T4→T3→T2→T1).

Specifically, for the fourth sub-carrier F4, the demodulation reference signals in the first layer of the resource block are respectively multiplied by the first to the fourth columns of chips [1, 1, 1, 1] in the first row of the orthogonal matrix E in the reverse direction of the time axis, the demodulation reference signals in the second layer of the resource block are respectively multiplied by the first to the fourth columns of chips [1, −1, 1, −1] in the second row of the orthogonal matrix E in the reverse direction of the time axis, the demodulation reference signals in the third layer of the resource block are respectively multiplied by the first to the fourth columns of chips [1, −1, −1, 1] in the third row of the orthogonal matrix E in the reverse direction of the time axis, and the demodulation reference signals in the fourth layer of the resource block are respectively multiplied by the first to the fourth columns of chips [−1, −1, 1, 1] in the fourth row of the orthogonal matrix E in the reverse direction of the time axis.

In FIG. 26, the mapping scheme for the orthogonal codes is unnecessary to span the adjacent resource blocks RB. It is very easy to verify that the energy on 4 OFDM symbols of T1~T4 are equal when the power of DMRS on the sub-carriers F1~F4 are superposed. Thus, the peak powers are averaged well.

Only the design for the DMRS mapping of the first to the fourth layers is described in the present embodiment. The mapping scheme of DMRS in the fifth to the eighth layers in the second embodiment is easily applied to a case of being with an extended cyclic prefix.

The above embodiments of the present disclosure are only exemplary description, and their specific structures and operations do not limit the scope of the disclosure. Those skilled in the art can recombine different parts and operations of the above respective embodiments to produce new implementations which equally accord with the concept of the present disclosure.

The embodiments of the present disclosure may be implemented by hardware, or a combination of hardware and software and firmware, and the way of implementation does not limit the scope of the present disclosure.

The connection relationships between the respective functional elements (units) in the embodiments of the disclosure do not limit the scope of the present disclosure, in which one or multiple functional element(s) or unit(s) may contain or be connected to any other functional elements.

Although several embodiments of the present disclosure has been shown and described in combination with attached drawings above, those skilled in the art should understand that variations and modifications which still fall into the scope of claims and their equivalents of the present disclosure can be made to these embodiments without departing from the principle and spirit of the disclosure.

The invention claimed is:

1. An integrated circuit comprising:
memory that stores a first orthogonal matrix and a second orthogonal matrix, each of which is a matrix with N rows and N columns where N is a natural number equal to or larger than 2, the second orthogonal matrix generated by cyclically shifting chips of particular rows of the first orthogonal matrix;
mapping circuitry coupled to the memory, wherein the circuitry, in operation, multiplies demodulation reference signals for a first layer group with the first orthogonal matrix to obtain first multiplying results; superposingly maps the first multiplying results in a same time period of a first subcarrier group in a resource block; multiplies demodulation reference signals for a second layer group with the second orthogonal matrix to obtain second multiplying results; and superposingly maps the second multiplying results in a same time period of a second subcarrier group which is different from the first subcarrier group in the resource block, each of the first layer group and the second layer group comprising N layers; and
transmitting circuitry which, in operation, transmits the resource block on which the multiplied demodulation reference signals for the first layer group and the multiplied demodulation reference signals for the second layer group are mapped, the mapped demodulation reference signals to be used by a communication partner apparatus to demodulate data signals that are superposed in each layer of the first layer group and the second layer group in the resource block.

2. The integrated circuit according to claim 1, wherein the memory stores the first orthogonal matrix with four rows, and the particular rows are a third row and a fourth row of the first orthogonal matrix.

3. The integrated circuit according to claim 1, wherein the mapping circuitry, in operation, superposingly maps the first multiplying results in the first subcarrier group including a plurality of subcarriers that are located at separate positions from each other on a frequency axis; and
the mapping circuitry, in operation, superposingly maps the second multiplying results in the second subcarrier group including a plurality of subcarriers that are located at separate positions from each other on the frequency axis.

4. The integrated circuit according to claim 1, wherein the first layer group comprises N layers from a first layer to an Nth layer, and the mapping circuitry, in operation, multiplies an Lth row of the first orthogonal matrix and a demodulation reference signal for an Lth layer to obtain the first multiplying results, where L is a natural number equal to or larger than 1 and equal to or smaller than N; and
the second layer group comprises N layers from an (N+1)th layer to a (2N)th layer, and the mapping circuitry, in operation, multiplies an Mth row of the second orthogonal matrix and a demodulation reference signal for an (N+M)th layer to obtain the second multiplying results, where M is a natural number equal to or larger than 1 and equal to or smaller than N.

5. The integrated circuit according to claim 1, wherein the mapping circuitry, in operation, multiplies the demodulation reference signals for the first layer group with the first orthogonal matrix, using a multiplying direction for an odd numbered subcarrier included in the first subcarrier group, which is opposite from a multiplying direction used for an even numbered subcarrier included in the first subcarrier group;

the mapping circuitry, in operation, multiplies the demodulation reference signals for the second layer group with the second orthogonal matrix, using a multiplying direction for an odd numbered subcarrier included in the second subcarrier group, which is opposite from a multiplying direction used for an even numbered subcarrier included in the second subcarrier group; and the multiplying direction for the odd numbered subcarrier included in the first subcarrier group is same as the multiplying direction for the even numbered subcarrier included in the second subcarrier group.

6. An integrated circuit comprising:

memory that stores a first orthogonal matrix and a second orthogonal matrix, each of which is a matrix with N rows and N columns where N is a natural number equal to or larger than 2, the second orthogonal matrix generated by cyclically shifting chips of particular rows of the first orthogonal matrix;

receiving circuitry coupled to the memory, the receiving circuitry, in operation, receives a signal on which a plurality of layers are multiplexed, wherein, in the received signal, first multiplying results are superposed and mapped to a same time frame of a first subcarrier group and second multiplying results are superposed and mapped to a same time frame of a second subcarrier group which is different from the first subcarrier group, with the first and the second subcarrier groups included in a resource block, the first multiplying results obtained by multiplying demodulation reference signals for respective layers included in a first layer group with chips of the respective rows of the first orthogonal matrix, and the second multiplying results obtained by multiplying demodulation reference signals for respective layers included in a second layer group with chips of respective rows of the second orthogonal matrix, each of the first layer group and the second layer group comprising N layers; and demultiplexing circuitry coupled to the receiving circuitry, wherein the demultiplexing circuitry, in operation, demultiplexes the demodulation reference signals for respective layers included in the first layer group, by multiplying signals that are respectively mapped to a plurality of subcarriers included in the first subcarrier group with the chips of respective rows of the first orthogonal matrix, and demultiplexes the demodulation reference signals for respective layers included in the second layer group, by multiplying signals that are respectively mapped to a plurality of subcarriers included in the second subcarrier group with the chips of respective rows of the second orthogonal matrix, and demodulates data signals that are superposed in each layer of the first layer group and the second layer group in the resource block using the demultiplexed demodulation reference signals for respective layers.

7. The integrated circuit according to claim 6, further comprising:

at least one output coupled to the demultiplexing circuitry, wherein the at least one output, in operation, outputs the demodulated data signals.

8. The integrated circuit according to claim 6, wherein the memory stores the first orthogonal matrix with four rows, and the particular rows are third and fourth rows of the first orthogonal matrix.

9. The integrated circuit according to claim 6, wherein:

the receiving circuitry, in operation, receives the first multiplying results in the first subcarrier group including the plurality of subcarriers, which are located at separate positions from each other on a frequency axis; and the receiving circuitry, in operation, receives the second multiplying results in the second subcarrier group including the plurality of subcarriers, which are located at separate positions that are different from any of frequency positions of the plurality of subcarriers included in the first subcarrier group.

10. The integrated circuit according to claim 6, wherein:

the first layer group comprises N layers including a first layer to an Nth layer, and the receiving circuitry, in operation, receives the first multiplying results obtained by multiplying chips of an Lth row of the first orthogonal matrix and a demodulation reference signal for an Lth layer, where L is a natural number equal to or larger than 1 and equal to or smaller than N; and the second layer group comprises N layers including an (N+1)th layer to a (2N)th layer, and the receiving circuitry, in operation, receives the second multiplying results obtained by multiplying chips of an Mth row of the second orthogonal matrix and a demodulation reference signal for an (N+M)th layer, where M is a natural number equal to or larger than 1 and equal to or smaller than N.

11. The integrated circuit according to claim 6, wherein:

the demultiplexing circuitry, in operation, multiplies the signals that are respectively mapped to the plurality of subcarriers included in the first subcarrier group, for the first layer group, with the first orthogonal matrix, using a multiplying direction for an odd numbered subcarrier included in the first subcarrier group, which is opposite from a multiplying direction used for an even numbered subcarrier included in the first subcarrier group;

the demultiplexing circuitry, in operation, multiplies the signals that are respectively mapped to the plurality of subcarriers included in the second subcarrier group, for the second layer group, with the second orthogonal matrix, using a multiplying direction for an odd numbered subcarrier included in the second subcarrier group, which is opposite from a multiplying direction used for an even numbered subcarrier included in the second subcarrier group; and the multiplying direction for the odd numbered subcarrier included in the first subcarrier group is same as the multiplying direction for the even numbered subcarrier included in the second subcarrier group.

* * * * *